US007006365B2

(12) United States Patent
Kitano

(10) Patent No.: US 7,006,365 B2
(45) Date of Patent: Feb. 28, 2006

(54) SWITCHING POWER SUPPLY APPARATUS

(75) Inventor: Saburou Kitano, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 10/695,741

(22) Filed: Oct. 30, 2003

(65) Prior Publication Data

US 2004/0090805 A1 May 13, 2004

(30) Foreign Application Priority Data

Nov. 1, 2002 (JP) ............................ 2002-319572

(51) Int. Cl.
*H02H 7/122* (2006.01)

(52) U.S. Cl. ..................................... 363/56.03; 363/97

(58) Field of Classification Search .................. 363/55, 363/56.01, 56.03, 49, 95, 97, 131
See application file for complete search history.

(56) References Cited

U.S. PATENT DOCUMENTS 4,156,273 A * 5/1979 Sato ........................ 363/21.16
4,281,378 A * 7/1981 Ogino et al. .................. 363/96
5,982,649 A * 11/1999 Turner ......................... 363/89
6,229,366 B1 * 5/2001 Balakirshnan et al. ...... 327/172

FOREIGN PATENT DOCUMENTS

JP 9-98574 A 4/1997
JP 10-304658 A 11/1998

* cited by examiner

*Primary Examiner*—Adolf Berhane
(74) *Attorney, Agent, or Firm*—Birch, Stewart, Kolasch & Birch, LLP

(57) ABSTRACT

A switching power supply apparatus is provided that is not thermally destroyed even if the load remains short-circuited for a long time when the voltage of the commercially distributed alternating-current power supplied thereto is high. When the load connected between a positive and a negative output terminal is short-circuited, the short-circuited state is detected by an output voltage detection circuit, and a switching control circuit stops operating. At start-up, a current from a bridge rectifier circuit is fed, as a startup current, through a constant current circuit to the switching control circuit. Thus, even when the voltage of the commercially distributed alternating-current power is high, a constant current flows through the switching control circuit. This permits the power consumed with the load short-circuited when the input voltage from the commercially distributed alternating-current power is high to be approximated to that consumed when the input voltage is low.

18 Claims, 12 Drawing Sheets

OPERATION START VOLTAGE
MINIMUM OPERATING VOLTAGE

X0
X1
X2
X3
X4
X5
X6

SWITCHING POWER SUPPLY APPARATUS

CROSS REFERENCE TO RELATED APPLICATION

This Nonprovisional application claims priority under 35 U.S.C. §119(a) on patent application Ser. No. 2002-319572 filed in Japan on Nov. 1, 2002, the entire contents of which are hereby incorporated by reference.

BACKGROUND OF THE INVENTION

1. Field of the Invention

The present invention relates to a switching power supply apparatus used as a direct-current power source for an electronic appliance, and more particularly to a switching power supply apparatus provided with an overcurrent protection circuit that protects the switching power supply apparatus from an excessively large output current.

2. Description of the Prior Art

Conventionally, switching power supply apparatuses are provided with an overcurrent protection circuit to prevent their destruction resulting from an excessively large output current, for example, when the output terminals are short-circuited together.

Protection against an overcurrent by means of an overcurrent protection circuit is realized in the following manner. According to one method, called the shut-down method, when a switching power supply apparatus enters a predetermined overcurrent state, switching operation is stopped, and, even when the overcurrent state is cancelled, switching operation is not restarted automatically, but it is only when the power to the switching power supply apparatus is turned off first and then on that the switching power supply apparatus restarts switching operation. According to another method, called the automatic recovery method, canceling the overcurrent protection state causes the switching power supply apparatus to restart switching operation automatically. Which of these methods to adopt is determined at the time of designing a switching power supply apparatus according to the characteristics of the electronic appliance that is fed with power by the switching power supply apparatus and the user's preference.

FIG. 10 is a circuit diagram of a conventional switching power supply apparatus that adopts the automatic recovery method. In FIG. 10, commercially distributed alternating-current power (not shown) is connected to alternating-current power input terminals 1 and 2. Between the alternating-current power input terminals 1 and 2, there is connected, by way of a filter 3, a bridge rectifier circuit 4. The filter 3 is composed of a capacitor 3*a*, line filter coils 3*b*, and a capacitor 3*c*. The bridge rectifier circuit 4 is composed of diodes 4*a*, 4*b*, 4*c*, and 4*d*. The filter 3 and the bridge rectifier circuit 4 are connected together by lines L1 and L2, and between these lines L1 and L2 is connected a discharge resistor 31.

The output ends of the bridge rectifier circuit 4 are connected to a positive power supply line L3 and a negative power supply line L4, respectively, and between these lines L3 and L4 are connected a capacitor 5, a serial circuit composed of a primary coil 6*a* of a transformer 6 and an FET (field-effect transistor) 7, and a serial circuit composed of a resistor 15 and a capacitor 17. The FET 7 functions as the main switching device of this switching power supply apparatus. One end of an auxiliary coil 6*c* of the transformer 6 is connected through a diode 16 to the node between the resistor 15 and the capacitor 17, and the other end of the auxiliary coil 6*c* is connected to the negative power supply line L4.

A switching control circuit 14 has a positive power input terminal thereof connected to the cathode of the diode 16, has a negative power input terminal thereof connected to the negative power supply line L4, has a feedback input terminal thereof connected to the collector of a phototransistor 13*b* of a photocoupler 13, and has an output terminal thereof connected to the gate of the FET 7.

One end of a secondary coil 6*b* of the transformer 6 is connected through a diode 8 to a positive output line L5, and the other end of the secondary coil 6*b* is connected to a negative output line L6. Between the positive and negative output lines L5 and L6, there are connected a capacitor 9, a serial circuit composed of a photodiode 13*a* of the photocoupler 13, a resistor 12*b*, and a shunt regulator 12*a*, and a serial circuit composed of resistors 12*d* and 12*c*. The node between the resistors 12*d* and 12*c* is connected to the monitoring terminal of the shunt regulator 12*a*. The shunt regulator 12*a* and the resistors 12*b*, 12*c*, and 12*d* together constitute an output voltage detection circuit 12.

The positive output line L5 is connected to a positive output terminal 10, and the negative output line L6 is connected through an output current detection circuit 18 to a negative output terminal 11. The control terminal of the output current detection circuit 18 is connected to the node between the photodiode 13*a* and the resistor 12*b*. The output current detection circuit 18 may be provided between the positive output line L5 and the positive output terminal 10.

Next, the operation of this conventional switching power supply apparatus will be described. When commercially distributed alternating-current power (not shown) is fed to the alternating-current power input terminals 1 and 2, it is fed through the filter 3 to the bridge rectifier circuit 4 and is thereby rectified. The rectified voltage is then smoothed by the capacitor 5 and is thereby converted into a direct-current voltage. This direct-current voltage is fed, as operating power for the main circuitry of the switching power supply apparatus, to the positive and negative power supply lines L3 and L4.

The direct-current voltage fed between the positive and negative power supply lines L3 and L4 makes the switching control circuit 14 operate so as to make the FET 7 perform switching operation. As a result, a high-frequency voltage is induced in the secondary coil 6*b* of the transformer 6, and this high-frequency voltage is rectified and smoothed by the diode 8 and the capacitor 9 and is thereby converted into a direct-current voltage. This direct-current voltage is fed, via the positive and negative output terminals 10 and 11, to an electronic appliance (not shown) that serves as a load.

The voltage between the positive and negative output lines L5 and L6 is divided by a voltage division circuit constituted by the serially connected resistors 12*d* and 12*c*, and the divided voltage is fed, as a monitored voltage, to the monitoring terminal of the shunt regulator 12*a*. The shunt regulator 12*a* compares the monitored voltage fed to the monitoring terminal thereof with a reference voltage previously set therein, and feeds a current commensurate with the result of the comparison to the photodiode 13*a* of the photocoupler 13 to make the photodiode 13*a* emit light.

The light from the photodiode 13*a* is received by the phototransistor 13*b* of the photocoupler 13, and the phototransistor 13*b* feeds, as a feedback signal, a voltage commensurate with the result of the aforementioned comparison to the feedback input terminal of the switching control circuit 14. The switching control circuit 14 controls, according to the feedback signal thus fed thereto, the switching operation of the FET 7 so as to stabilize the output voltage of the switching power supply apparatus.

When the switching power supply apparatus starts to start up, the switching control circuit 14 starts to operate from the current fed from the positive terminal of the capacitor 5 through the start-up resistor 15. By contrast, when the switching power supply apparatus is operating in a steady state, the switching control circuit 14 operates mainly from the direct-current power produced by rectifying and smoothing, with the diode 16 and the capacitor 17, the voltage induced in the auxiliary coil 6*c* of the transformer 6.

The output current detection circuit 18, which is connected between the negative output line L6 and the negative output terminal 11, compares the current on the negative output line L6 with a reference current previously set therein. When the current on the negative output line L6 is larger than the reference current, the output current detection circuit 18 short-circuits together the cathode of the photodiode 13*a* of the photocoupler 13 and the negative output line L6. This increases the current through the photodiode 13*a*. In a case where the output current detection circuit 18 is connected between the positive output line L5 and the positive output terminal 10, the current on the positive output line L5 is compared with the aforementioned reference current.

When the switching control circuit 14 is fed, through the phototransistor 13*b*, with information on this increase in the current in the form of a feedback signal, the switching control circuit 14 recognizes that the output voltage of the switching power supply apparatus has increased greatly, and thus controls the switching operation of the FET 7 in the direction in which the output power of the switching power supply apparatus decreases.

FIGS. 11A to 11C are voltage waveform diagrams illustrating the operation of the switching power supply apparatus at start-up. Now, with reference to these voltage waveform diagrams, how the switching power supply apparatus operates at start-up will be described.

When commercially distributed alternating-current power is connected between the alternating-current power input terminals 1 and 2 at a time point TO shown in FIGS. 11A to 11C, a start-up current is fed from the positive terminal of the capacitor 5 through the start-up resistor 15 to the capacitor 17, and this causes the charge voltage Vcc of the capacitor 17 to increase gradually as shown in FIG. 11A. When the charge voltage Vcc reaches the operation start voltage of the switching control circuit 14 at a time point T1, the switching control circuit 14 starts to feed a drive signal to the FET 7. As a result, the switching power supply apparatus starts to start up, and thus the output voltage Vo of the switching power supply apparatus (i.e., the voltage between the output terminals 10 and 11) starts to increase as shown in FIG. 11B. The output voltage Vo reaches the target output voltage of the switching power supply apparatus at a time point T3.

After the time point T1, an induced voltage appears in the auxiliary coil 6*c* of the transformer 6 as shown in FIG. 11B, and the voltage level of this induced voltage in the positive direction increases in proportion to the output voltage of the switching power supply apparatus until, at a time point T2, it becomes equal to the voltage level of the charge voltage Vcc. Now, a current produced by rectifying the included voltage with the diode 16 flows into the capacitor 17, and thus the charge voltage Vcc starts to increase as shown in FIG. 11A. After the time point T3, i.e., once the target output voltage of the switching power supply apparatus is reached, the charge voltage Vcc stabilizes at a fixed voltage proportional to the output voltage.

As shown in FIG. 11A, during the period from the time point T0 to the time point T1, the charge voltage Vcc increases owing to the current fed through the start-up resistor 15 because, during that period, the switching control circuit 14 is not operating and thus consumes only a small current. However, when the switching control circuit 14 starts to operate at the time point T1, the current consumed by the switching control circuit 14 becomes larger than the current fed through the start-up resistor 15. This causes the charge voltage Vcc to start to decrease. Then, at the time point T2, the charge voltage Vcc start to increase again.

Accordingly, the capacitor 17 needs to be given a sufficiently high capacity to prevent the charge voltage Vcc of the capacitor 17 from becoming lower than the minimum operating voltage of the switching control circuit 14 during the period from the time point T1 to the time point T3.

FIGS. 12A to 12C are voltage waveform diagrams illustrating the overcurrent protection operation performed in the switching power supply apparatus. Now, with reference to these voltage waveform diagrams, how the overcurrent protection operation is performed in the switching power supply apparatus will be described.

For example, while the switching power supply apparatus is operating in the steady state, if, at a time point t0 shown in FIGS. 12A to 12C, the output terminals 10 and 11 are short-circuited together because of a fault or the like in the electronic appliance connected as a load to the switching power supply apparatus, the output voltage of the switching power supply apparatus falls sharply as shown in FIG. 12B, and an excessively large current flows through the positive and negative output lines L5 and L6.

This excessively large current is detected by the output current detection circuit 18, which then short-circuits together the cathode of the photodiode 113*a* and the negative output line L6. This causes the current through the photodiode 113*a* to increase, and information on this increase in the current is fed, in the form of a feedback signal, through the phototransistor 13*b* to the switching control circuit 14.

Thus, the switching control circuit 14 recognizes that the output voltage of the switching power supply apparatus has increased, and therefore controls the switching operation of the FET 7 in the direction in which the output power of the switching power supply apparatus decreases. Here, however, the switching operation is not completely stopped until a time point t1, as will be described later.

Specifically, in the period from the time point t0 to the time point t1, when the voltage between the node between the positive output line L5 and the anode of the photodiode 113*a* and the point on the negative output line L6 at which the output current detection circuit 18 is connected thereto decreases, the currents that flow through the photodiode 113*a* and the phototransistor 13*b* decrease, and therefore the switching control circuit 14 controls the switching operation of the FET 7 in the direction in which the output power of the switching power supply apparatus increases commensurately with the decrease in those currents.

On the other hand, when the voltage between the node between the positive output line L5 and the anode of the photodiode 113*a* and the point on the negative output line L6 at which the output current detection circuit 18 is connected thereto increases, the currents that flow through the photodiode 113*a* and the phototransistor 13*b* increase, and therefore the switching control circuit 14 controls the switching operation of the FET 7 in the direction in which the output power of the switching power supply apparatus decreases commensurately with the increase in those currents. Thus, the switching power supply apparatus outputs power of which the level is such that a proper balance is achieved among these conflicting factors.

Moreover, during the period from the time point t0 to the time point t1, since, as described earlier, the positive-direction voltage level of the induced voltage that appears in the auxiliary coil 6*c* of the transformer 6 is proportional to the output voltage of the switching power supply apparatus, the positive-direction voltage level of the induced voltage is low, and therefore no current is fed through the diode 16 to the capacitor 17.

Accordingly, the start-up current fed through the start-up resistor 15 is smaller than the current consumed by the switching control circuit 14, and thus the charge voltage Vcc of the capacitor 17 decreases gradually until, at the time point t1, it becomes equal to the minimum operating voltage of the switching control circuit 14. Now, the switching control circuit 14 stops operating, and thus the switching power supply apparatus stops switching operation.

In the following period from the time point t1 to a time point t2, the switching control circuit 14 is not operating and thus consumes only a small current. Accordingly, the charge voltage Vcc of the capacitor 17 increases gradually as shown in FIG. 12A owing to the start-up current fed through the start-up resistor 15 until, at the time point t2, it becomes equal to the operation start voltage of the switching control circuit 14. Now, the switching power supply apparatus restarts switching operation.

During this period from the time point t1 to the time point t2, since the switching power supply apparatus is not performing switching operation, as shown in FIGS. 12B and 12C, the output voltage of the switching power supply apparatus is zero, and therefore no included voltage appears in the auxiliary coil 6*c* of the transformer 6. Thus, no current is fed through the diode 16 to the capacitor 17.

Then, during the period from the time point t2 to a time point t3, as during the period from the time point t0 to the time point t1, the switching power supply apparatus so controls as to output low but fixed power. Accordingly, the positive-direction voltage level of the induced voltage that appears in the auxiliary coil 6*c* of the transformer 6 is low, and thus no current is fed through the diode 16 to the capacitor 17. As a result, the start-up current fed through the start-up resistor 15 is smaller than the current consumed by the switching control circuit 14, and thus the charge voltage Vcc of the capacitor 17 decreases gradually until, at the time point t3, it becomes equal to the minimum operating voltage of the switching control circuit 14. Now, the switching control circuit 14 stops operating, and thus the switching power supply apparatus stops switching operation.

After the time point t3, as long as the positive and negative output terminals 10 and 11 are short-circuited together, the operations described above that are performed during the period from the time point t1 to the time point t3 are repeated.

When the positive and negative output terminals 10 and 11 cease to be short-circuited, the output current detection circuit 18 cancels the short-circuiting between the cathode of the photodiode 113*a* of the photocoupler 113 and the negative output line L6. Thus, when a switching operation period (for example, the period from the time point t2 to the time point t3, or the period from a time point t4 to a time point t5 (the time point t5 is not shown in the figure), or any of the succeeding similar switching operation periods) starts, only the current to the shunt regulator 12*a* of the output voltage detection circuit 12 flows through the photodiode 113*a*, and this causes the switching power supply apparatus to enter the steady state, in which its output voltage stabilizing function works.

A conventional switching power supply apparatus, like the one described above, that incorporates an overcurrent protection circuit adopting the automatic recover method and that includes a high-capacity power-smoothing capacitor 17 has the disadvantage that, for example when the positive and negative output terminals 10 and 11 are short-circuited together because of a fault in the electronic appliance that is connected as a load to the positive and negative output terminals 10 and 11, the switching power supply apparatus outputs a current larger than the overcurrent protection capability previously set therein. This may cause destruction of the switching power supply apparatus.

Now, the cause of the noted problem will be explained. In this conventional switching power supply apparatus, the capacitor 17 needs to be given a sufficiently high capacitance so that, when the switching power supply apparatus starts to start up, the charge voltage Vcc does not become lower than the minimum operating voltage of the switching control circuit 14, for example, during the period from the time point T1 to the time point T2 shown in FIGS. 11A to 11C.

Otherwise, the charge voltage of the capacitor 17 becomes lower than the minimum operating voltage of the switching control circuit 14 before the positive-direction voltage induced in the auxiliary coil 6*c* of the transformer 6 becomes higher than the minimum operating voltage of the switching control circuit 14, and thus before the current fed from the auxiliary coil 6*c* of the transformer 6 through the diode 16 permits the switching control circuit 14 to operate continuously. That is, switching operation is stopped in the middle of start-up operation.

Accordingly, in a case where the capacitance of the power-smoothing capacitor connected between the power input terminals of the load-side appliance (not shown) is high, the extra time required for the switching power supply apparatus to charge the power-smoothing capacitor connected between the power input terminals of the load-side appliance slows down the rate at which the output voltage of the switching power supply apparatus increases, and, since the positive-direction induced voltage that appears in the auxiliary coil 6*c* of the transformer 6 increases in proportion to the output voltage of the switching power supply apparatus, the rate at which this induced voltage increases is also slowed down. Thus, in a case where the power-smoothing capacitor connected between the power input terminals of the load-side appliance (not shown) is high, it is necessary to give the capacitor 17 a higher capacity so as to extend the time during which the switching control circuit 14 operates from the current discharged from the capacitor 17.

On the other hand, it is also necessary to make relatively short the time required for the switching power supply apparatus to start up so that the user of the apparatus does not feel inconvenience when using it. This time is determined mainly by the time required for the charge voltage of the capacitor 17 to reach the operation start voltage of the switching control circuit 14 owing to the current fed through the start-up resistor 15 (i.e., the period from the time point T0 to the time point T1).

Accordingly, increasing the capacitance of the capacitor 17 inevitably necessitates reducing the resistance of the start-up resistor 15 so as to make the time required for the switching power supply apparatus to start up equal to or shorter than a predetermined length of time.

The conventional switching power supply apparatus shown in FIG. 10 alternately repeats the operations performed during the period from the time point t1 to the time point t2 shown in FIGS. 12A to 12C and the operations performed during the period from the time point t2 to the time point t3 as long as the positive and negative output terminals 10 are short-circuited together. Whereas, during the period from the time point t1 to the time point t2, switching operation is not performed and therefore the switching power supply apparatus consumes almost no power, during the period from the time point t2 to the time point t3, switching operation is performed and so much power is consumed as to output power of which the level is such that a proper balance is achieved among the conflicting factors mentioned earlier, namely the factors that increase the output voltage and those that decreases it, causing mainly the diode 8 and the FET 7 to become hot.

In particular, the voltage between the node between the positive output line L5 and the anode of the photodiode 113*a* and the point on the negative output line L6 at which the output current detection circuit 18 is connected thereto becomes equal to or higher than the forward voltage drop across the photodiode 113*a*, and a current equal to this voltage divided by the resistance of the positive and negative output lines L5 and L6 flows through the positive and negative output lines L5 and L6. This resistance is approximately close to zero ohms, and thus produces a short-circuited state. As a result, an excessively large current flows through the diode 8 provided on the positive output line L5, causing the diode 8 to become extremely hot.

Accordingly, to reduce the power consumed by the switching power supply apparatus and to prevent thermal destruction of the diode 8 and other components when the switching power supply apparatus is in the short-circuited state described above, it is necessary to make the period from the time point t2 to the time point t3 shorter relative to the period from the time point t1 to the time point t2.

As described earlier, reducing the resistance of the start-up resistor 15 so as to increase the current fed through the start-up resistor 15 tends to make the period from the time point t2 to the time point t3 longer relative to the period from the time point t1 to the time point t2 for the reason that will be stated later.

Here, to simplify the explanations, it is assumed that a current Ik is constantly fed from the capacitor 5 through the start-up resistor 15 to the capacitor 17, and that the switching control circuit 14 consumes a current Is in a switching operation period (in FIGS. 12A to 12C, the period from the time point t2 to the time point t3, or the period from the time point t4 to the time point t5 (not shown)). Moreover, to make calculations simple, it is assumed that the switching control circuit 14 consumes zero amperes in a no-switching-operation period (in FIGS. 12A to 12C, the period from the time point t1 to the time point t2, or the period from the time point t3 to the time point t4).

Moreover, it is also assumed that the operation start voltage and the minimum operating voltage of the switching control circuit 14 are Eh and EL, respectively, and that the capacitor 17 has a capacitance C. Then, the switching operation period Ton and the no-switching-operation period Toff are given by formula (1) and (2) below.

$$Ton=(Eh-EL)/[C\times(Is-Ik)] \quad (1)$$

$$Toff=(Eh-EL)/(C\times Ik) \quad (2)$$

The ratio of the switching operation period Ton to the no-switching-operation period Toff is given by formula (3) below.

$$Ton/Toff=Ik/(Is-Ik) \quad (3)$$

This proves that, as the current Ik fed through the start-up resistor 15 to the switching control circuit 14 increases, the period from the time point t2 to the time point t3 becomes longer relative to the period from the time point t1 to the time point t2.

In the short-circuited state described above, the problem of increased power consumption by the switching power supply apparatus and the problem of thermal destruction, possibly resulting from the increased power consumption, of the diode 8 provided on the positive output line L5 are particularly striking in switching power supply apparatuses designed for use worldwide. Typically, switching power supply apparatuses of this type are required to guarantee prescribed performance and safety even if the voltage of the commercially distributed alternating-current power supplied thereto varies, for example, in the range from 85 V to 264 V.

As described earlier, it is necessary to appropriately set the capacitance of the capacitor 17 and then, assuming that the voltage of the commercially distributed alternating-current power is 85 V, set the resistance of the start-up resistor 15 to make the time required for the switching power supply apparatus to start up so short that the user of the apparatus does not feel inconvenience when using it. With these settings, however, when the voltage of the commercially distributed alternating-current power is 264 V, the current fed through the start-up resistor 15 is about three times as large as when the voltage of the commercially distributed alternating-current power is 85 V. This results in an extremely high ratio of the switching operation period to the no-switching-operation period when the load is short-circuited, and thus increases the power consumption by the switching power supply apparatus and the heat dissipation by the diode 8 and other components, causing them to become hot.

Thus, with a conventional switching power supply apparatus incorporating an overcurrent protection circuit as described above, when the voltage of the commercially distributed alternating-current power supplied thereto is high, if the load remains short-circuited for a long time, quite inconveniently, the switching power supply apparatus may be destroyed thermally.

Incidentally, Japanese Patent Application Laid-Open No. H10-304658 discloses a switching power supply apparatus that is so configured as to stabilize the output voltage in a light-load state without the use of a dummy resistor for the purpose of reducing power consumption in a light-load state. This configuration, however, does not solve the aforementioned problems because it is not protected against thermal destruction of circuit components that may result if the load remains short-circuited for a long time when the voltage of the commercially distributed alternating-current power supplied thereto is high.

SUMMARY OF THE INVENTION

An object of the present invention is to provide a switching power supply apparatus that is not thermally destroyed even if the load remains short-circuited for a long time when the voltage of the commercially distributed alternating-current power supplied thereto is high.

To achieve the above object, according to one aspect of the present invention, a switching power supply apparatus has a serial circuit, including the primary coil of a transformer and a main switching device, connected between a positive and a negative power supply line connected to direct-current power produced from commercially distributed alternating-current power. The switching power supply apparatus outputs a direct-current voltage obtained by rectifying and smoothing a high-frequency voltage induced in the secondary coil of the transformer by the main switching device performing switching operation. Here, the switching power supply apparatus further includes: a constant current circuit that feeds a constant current to a switching control circuit for controlling the main switching device even when the alternating-current voltage of the commercially distributed alternating-current power varies.

In this switching power supply apparatus, even when the voltage of the commercially distributed alternating-current power varies, the switching control circuit is fed with a constant current from the constant current circuit. This permits the power consumed with the load short-circuited when the input voltage from the commercially distributed alternating-current power is high to be approximated to that consumed when the input voltage is low. Thus, it is possible to prevent thermal destruction even if the load remains short-circuited for a long time when the input voltage from the commercially distributed alternating-current power is high.

According to another aspect of the present invention, a switching power supply apparatus has a serial circuit, including the primary coil of a transformer and a main switching device, connected between a positive and a negative power supply line connected to direct-current power produced from commercially distributed alternating-current power. The switching power supply apparatus outputs, via a positive and a negative output terminal, a direct-current voltage obtained by rectifying and smoothing with a rectifying/smoothing circuit a high-frequency voltage induced in the secondary coil of the transformer by the main switching device performing switching operation. Here, the switching power supply apparatus further includes: an output voltage detection circuit that detects the voltage between the positive and negative output terminals; a switching control circuit that controls the switching operation of the main switching device according to detection information from the output voltage detection circuit; a steady-state operation power supply circuit that feeds the switching control circuit with operating power produced by rectifying and smoothing the voltage that is induced in the auxiliary coil of the transformer substantially in proportion to the output voltage between the positive and negative output terminals during steady-state operation; and a constant current circuit that receives a current from the direct-current power or the commercially distributed alternating-current power at start up to feed the switching control circuit with a constant start-up current.

In this switching power supply apparatus, when the load connected between the positive and negative output terminals is, for example, short-circuited, this short-circuited state is detected by the output voltage detection circuit, and the switching control circuit stops operating. At start-up, a current from the direct-current power or the commercially distributed alternating-current power is fed, as a start-up current, through the constant current circuit to the switching control circuit.

Accordingly, even when the voltage of the commercially distributed alternating-current power becomes high, the switching control circuit is fed with a constant current from the constant current circuit. This permits the power consumed with the load short-circuited when the input voltage from the commercially distributed alternating-current power is high to be approximated to that consumed when the input voltage is low. Thus, it is possible to prevent thermal destruction even if the load remains short-circuited for a long time when the input voltage from the commercially distributed alternating-current power is high.

According to still another aspect of the present invention, a switching power supply apparatus has a serial circuit, including the primary coil of a transformer and a main switching device, connected between a positive and a negative power supply line connected to direct-current power produced from commercially distributed alternating-current power. The switching power supply apparatus outputs, via a positive and a negative output terminal, a direct-current voltage obtained by rectifying and smoothing with a rectifying/smoothing circuit a high-frequency voltage induced in the secondary coil of the transformer by the main switching device performing switching operation. Here, the switching power supply apparatus further includes: an output voltage detection circuit that detects the voltage between the positive and negative output terminals; a switching control circuit that controls the switching operation of the main switching device according to detection information from the output voltage detection circuit; a current detection circuit that is provided on the positive or negative output line and that short-circuits together both ends of the output voltage detection circuit when an overcurrent flows in the positive and negative output lines; a steady-state operation power supply circuit that feeds the switching control circuit with operating power produced by rectifying and smoothing a voltage that is induced in the auxiliary coil of the transformer substantially in proportion to the output voltage between the positive and negative output terminals during steady-state operation; and a constant current circuit that receives a current from the direct-current power or the commercially distributed alternating-current power at start up to feed the switching control circuit with a constant start-up current.

In this switching power supply apparatus, when the load connected between the positive and negative output terminals is, for example, short-circuited, the current detection circuit short-circuits together both ends of the output voltage detection circuit. Information on this short-circuiting is fed to the switching control circuit, and the switching control circuit stops operating. At start-up, a current from the direct-current power or the commercially distributed alternating-current power is fed, as a start-up current, through the constant current circuit to the switching control circuit.

Accordingly, even when the voltage of the commercially distributed alternating-current power becomes high, the switching control circuit is fed with a constant current from the constant current circuit. This permits the power consumed with the load short-circuited when the input voltage from the commercially distributed alternating-current power is high to be approximated to that consumed when the input voltage is low. Thus, it is possible to prevent thermal destruction even if the load remains short-circuited for a long time when the input voltage from the commercially distributed alternating-current power is high.

Preferably, the detection information from the voltage detection circuit is fed to the switching control circuit through the photodiode of a photocoupler which is connected in series with the voltage detection circuit between the positive and negative output lines and through the phototransistor of the photocoupler which is connected to the switching control circuit.

With this configuration, information on the voltage between the positive and negative output lines is detected by the voltage detection circuit. This detection information is transmitted, in the form of light, from the photodiode of the photocoupler to the phototransistor, and is then fed, in the form of a voltage, from the phototransistor to the switching control circuit. This helps simplify the wiring, and permits the voltage detection circuit and the switching control circuit to operate without electrically affecting each other, resulting in increased accuracy of the feedback control that is performed to stabilize the output voltage.

Preferably, the constant current circuit includes a serial circuit that is composed of a resistor and a Zener diode and that is connected between the positive and negative power supply lines and a resistor that is connected to the node between the resistor and the Zener diode and through which the start-up current is fed to the switching control circuit.

With this configuration, it is possible to realize the constant current circuit with a simple circuit configuration and thereby feed a constant start-up current to the switching control circuit.

Preferably, the constant current circuit includes a serial circuit, composed of a bias resistor of which one end is connected to the positive power supply line and a Zener diode, and a transistor of which the base is connected to the node between the bias resistor and the Zener diode, of which the collector is connected to the positive power supply line, and of which the emitter is connected through an emitter resistor to one end of the Zener diode, and the start-up current is fed from the emitter of the transistor through the emitter resistor to the switching control circuit.

With this configuration, it is possible to reduce the current consumption by the constant current circuit. By adopting the constant current circuit in a switching power supply apparatus that achieves reduction of power consumption by performing burst switching in a light-load state, it is possible to effectively reduce power consumption.

Preferably, the direct-current power is produced by subjecting the commercially distributed alternating-current power to full-wave rectification performed by a bridge rectifier circuit composed of bridge diodes, and the start-up current is fed from one end of the commercially distributed alternating-current power through a serial circuit composed of the constant current circuit and a reverse current prevention diode to the switching control circuit.

With this configuration, even when the voltage of the commercially distributed alternating-current power varies, the switching control circuit receives a constant current from the serial circuit composed of the constant current circuit and the reverse current prevention diode.

Preferably, the direct-current power is produced by subjecting the commercially distributed alternating-current power to full-wave rectification performed by a bridge rectifier circuit composed of bridge diodes, the start-up current is fed from one end of the commercially distributed alternating-current power through a serial circuit composed of the constant current circuit and a reverse current prevention diode to the switching control circuit, and the switching power supply apparatus further includes an oscillation frequency varying circuit that detects the voltage at the node between the constant current circuit and the reverse current prevention diode and that, by using this voltage as a drive signal, varies the oscillation frequency of the switching control circuit.

With this configuration, even when the voltage of the commercially distributed alternating-current power varies, the switching control circuit receives a constant current from the serial circuit composed of the constant current circuit and the reverse current prevention diode. Moreover, it is possible to detect the voltage at the node between the constant current circuit and the reverse current prevention diode and, by using this voltage as a drive signal, vary the oscillation frequency of the switching control circuit. Moreover, by detecting the voltage waveform extracted from the node between the constant current circuit and the reverse current prevention diode, it is possible to control the operation of the switching power supply apparatus in synchronism with the alternation period of the commercially distributed alternating-current power. For example, by varying the switching frequency stepwise in synchronism with the alternation period of the commercially distributed alternating-current power, it is possible to apparently reduce the noise generated by the switching power supply apparatus. The meaning of "apparently" here will be described later.

Preferably, the direct-current power is produced by subjecting the commercially distributed alternating-current power to full-wave rectification performed by a bridge rectifier circuit composed of bridge diodes, and the start-up current is fed from one of the nodes between a plurality of discharge resistors connected serially between both ends of the commercially distributed alternating-current power through a serial circuit composed of the constant current circuit and a reverse current prevention diode to the switching control circuit.

With this configuration, even when the voltage of the commercially distributed alternating-current power varies, the switching control circuit receives a constant current from the serial circuit composed of the constant current circuit and the reverse current prevention diode.

Preferably, the direct-current power is produced by subjecting the commercially distributed alternating-current power to full-wave rectification performed by a bridge rectifier circuit composed of bridge diodes, the constant current circuit includes a serial circuit, composed of a Zener diode and a plurality of resistors, connected between the negative power supply line and one of the nodes between a plurality of discharge resistors connected serially between both ends of the commercially distributed alternating-current power, a serial circuit composed of a resistor and a reverse current prevention diode is connected between the node between the resistors and the Zener diode and the operating power for the switching control circuit, and the oscillation frequency varying circuit varies the oscillation frequency of the switching control circuit by using as a drive signal a parabolic voltage produced by a capacitor connected between one of the nodes between the resistors and the negative power supply line.

With this configuration, it is possible to vary the switching frequency continuously in synchronism with the alternation period of the commercially distributed alternating-current power. This helps spread the noise spectrum more widely and thereby apparently further reduce the noise generated by the switching power supply apparatus.

Preferably, the detection information from the voltage detection circuit is fed to the switching control circuit through the photodiode of a photocoupler which is connected in series with the voltage detection circuit between the positive and negative output lines and through the phototransistor of the photocoupler which is connected to the switching control circuit, and the switching control circuit stops the switching operation of the main switching device by detecting a decrease in the current through the phototransistor when the load is short-circuited.

With this configuration, when the load of the switching power supply apparatus is short-circuited, a decrease in the currents through the photodiode and the phototransistor of the photocoupler is detected, and this causes the switching control circuit to stop operating. This can be effectively applied to an overcurrent protection system that is so configured that, when the load of a switching power supply apparatus is short-circuited, a decrease in the current through a photocoupler is detected to stop switching operation before the charge voltage of a capacitor owing to a start-up current becomes lower than the minimum operating voltage.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the drawings.

First Embodiment

Figure 1:
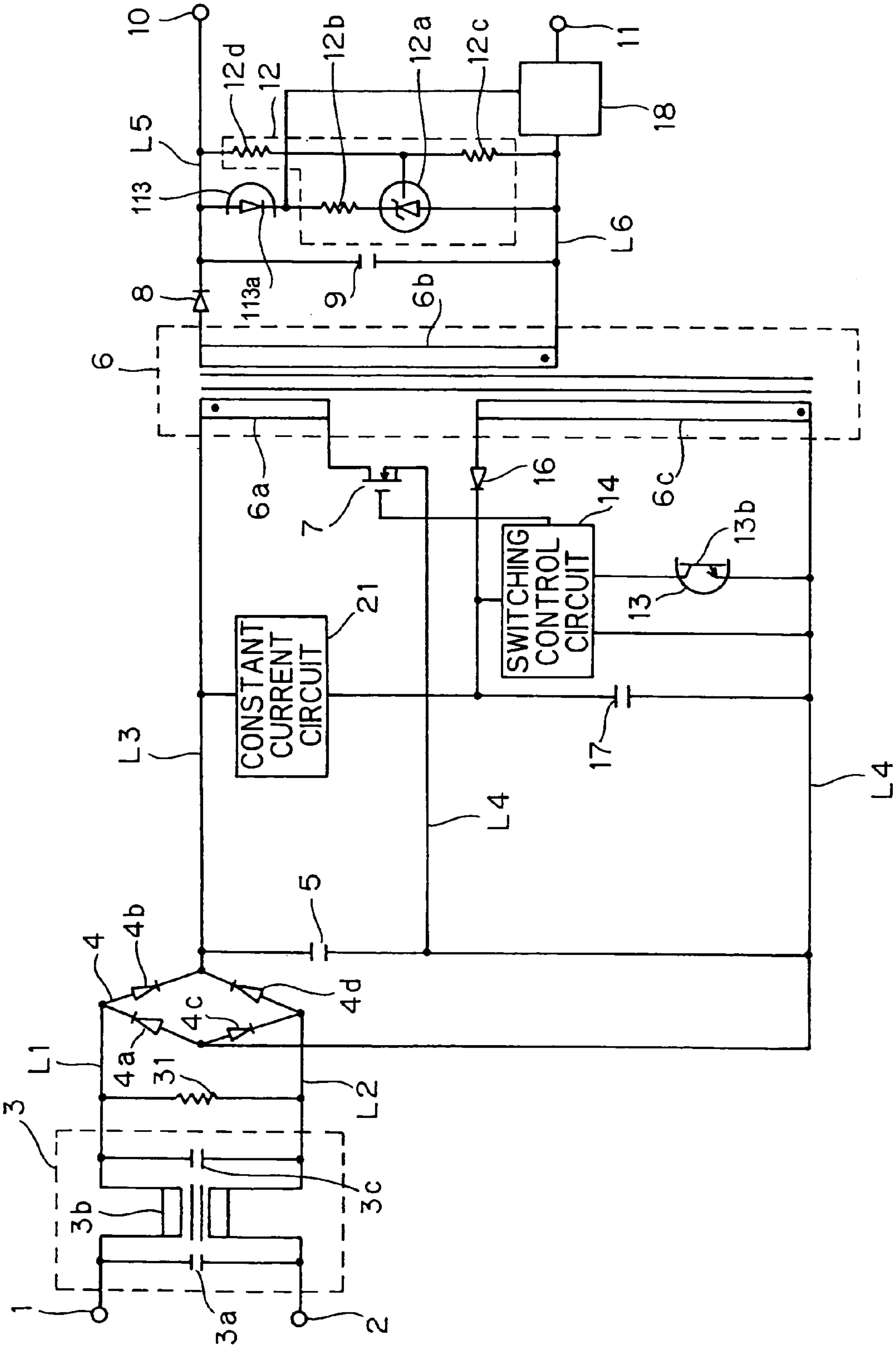
FIG. 1 is a circuit diagram of the switching power supply apparatus of a first embodiment of the invention.

FIG. 1 is a circuit diagram of the switching power supply apparatus of a first embodiment of the invention. This switching power supply apparatus adopts the automatic recovery method. In FIG. 1, commercially distributed alternating-current power (not shown) is connected to alternating-current power input terminals 1 and 2. Between the alternating-current power input terminals 1 and 2, there is connected, by way of a filter 3, a bridge rectifier circuit 4. The filter 3 is composed of a capacitor 3*a*, line filter coils 3*b*, and a capacitor 3*c*. The bridge rectifier circuit 4 is composed of diodes 4*a*, 4*b*, 4*c*, and 4*d*. The filter 3 and the bridge rectifier circuit 4 are connected together by lines L1 and L2, and between these lines L1 and L2 is connected a discharge resistor 31.

The output ends of the bridge rectifier circuit 4 are connected to a positive power supply line L3 and a negative power supply line L4, respectively, and between these lines L3 and L4 are connected a capacitor 5, a serial circuit composed of a primary coil 6*a* of a transformer 6 and an FET 7, and a serial circuit composed of a constant current circuit 21 and a capacitor 17. The FET 7 functions as the main switching device of this switching power supply apparatus. One end of an auxiliary coil 6*c* of the transformer 6 is connected through a diode 16 to the node between the constant current circuit 21 and the capacitor 17, and the other end of the auxiliary coil 6*c* is connected to the negative power supply line L4.

A switching control circuit 14 has a positive power input terminal thereof connected to the cathode of the diode 16, has a negative power input terminal thereof connected to the negative power supply line L4, has a feedback input terminal thereof connected to the collector of a phototransistor 13*b* of a photocoupler 13, and has an output terminal thereof connected to the gate of the FET 7.

One end of a secondary coil 6*b* of the transformer 6 is connected through a diode 8 to a positive output line L5, and the other end of the secondary coil 6*b* is connected to a negative output line L6. Between the positive and negative output lines L5 and L6, there are connected a capacitor 9, a serial circuit composed of a photodiode 113*a* of the photocoupler 113, a resistor 12*b*, and a shunt regulator 12*a*, and a serial circuit composed of resistors 12*d* and 12*c*. The node between the resistors 12*d* and 12*c* is connected to the monitoring terminal of the shunt regulator 12*a*. The shunt regulator 12*a* and the resistors 12*b*, 12*c*, and 12*d* together constitute an output voltage detection circuit 12.

The positive output line L5 is connected to a positive output terminal 10, and the negative output line L6 is connected through an output current detection circuit 18 to a negative output terminal 11. The control terminal of the output current detection circuit 18 is connected to the node between the photodiode 113*a* and the resistor 12*b*. The output current detection circuit 18 may be provided between the positive output line L5 and the positive output terminal 10.

Next, the operation of the switching power supply apparatus of the first embodiment will be described. When commercially distributed alternating-current power (not shown) is fed to the alternating-current power input terminals 1 and 2, it is fed through the filter 3 to the bridge rectifier circuit 4 and is thereby rectified. The rectified voltage is then smoothed by the capacitor 5 and is thereby converted into a direct-current voltage. This direct-current voltage is fed, as operating power for the main circuitry of the switching power supply apparatus, to the positive and negative power supply lines L3 and L4.

The direct-current voltage fed between the positive and negative power supply lines L3 and L4 makes the switching control circuit 14 operate so as to make the FET 7 perform switching operation. As a result, a high-frequency voltage is induced in the secondary coil 6*b* of the transformer 6, and this high-frequency voltage is rectified and smoothed by the diode 8 and the capacitor 9 and is thereby converted into a direct-current voltage. This direct-current voltage is fed, via the positive and negative output terminals 10 and 11, to an electronic appliance (not shown) that serves as a load.

The voltage between the positive and negative output lines L5 and L6 is divided by a voltage division circuit constituted by the serially connected resistors 12*d* and 12*c*, and the divided voltage is fed, as a monitored voltage, to the monitoring terminal of the shunt regulator 12*a*. The shunt regulator 12*a* compares the monitored voltage fed to the monitoring terminal thereof with a reference voltage previously set therein, and feeds a current commensurate with the result of the comparison to the photodiode 13*a* of the photocoupler 113 to make the photodiode 113*a* emit light.

The light from the photodiode 113*a* is received by the phototransistor 13*b* of the photocoupler 13, and the phototransistor 13*b* feeds, as a feedback signal, a voltage commensurate with the result of the aforementioned comparison to the feedback input terminal of the switching control circuit 14. The switching control circuit 14 controls, according to the feedback signal thus fed thereto, the switching operation of the FET 7 so as to stabilize the output voltage of the switching power supply apparatus.

When the switching power supply apparatus starts to start up, the switching control circuit 14 starts to operate from the constant current fed from the positive terminal of the capacitor 5 through the constant current circuit 21. By contrast, when the switching power supply apparatus is operating in a steady state, the switching control circuit 14 operates mainly from the direct-current power produced by rectifying and smoothing, with the diode 16 and the capacitor 17, the voltage induced in the auxiliary coil 6*c* of the transformer 6.

The output current detection circuit 18, which is connected between the negative output line L6 and the negative output terminal 11, compares the current on the negative output line L6 with a reference current previously set therein. When the current on the negative output line L6 is larger than the reference current, the output current detection circuit 18 short-circuits together the cathode of the photodiode 113*a* of the photocoupler 13 and the negative output line L6. This increases the current through the photodiode 113*a*. In a case where the output current detection circuit 18 is connected between the positive output line L5 and the positive output terminal 10, the current on the positive output line L5 is compared with the aforementioned reference current.

When the switching control circuit 14 is fed, through the phototransistor 13*b*, with information on this increase in the current in the form of a feedback signal, the switching control circuit 14 recognizes that the output voltage of the switching power supply apparatus has increased greatly, and thus controls the switching operation of the FET 7 in the direction in which the output power of the switching power supply apparatus decreases.

Figure 10:
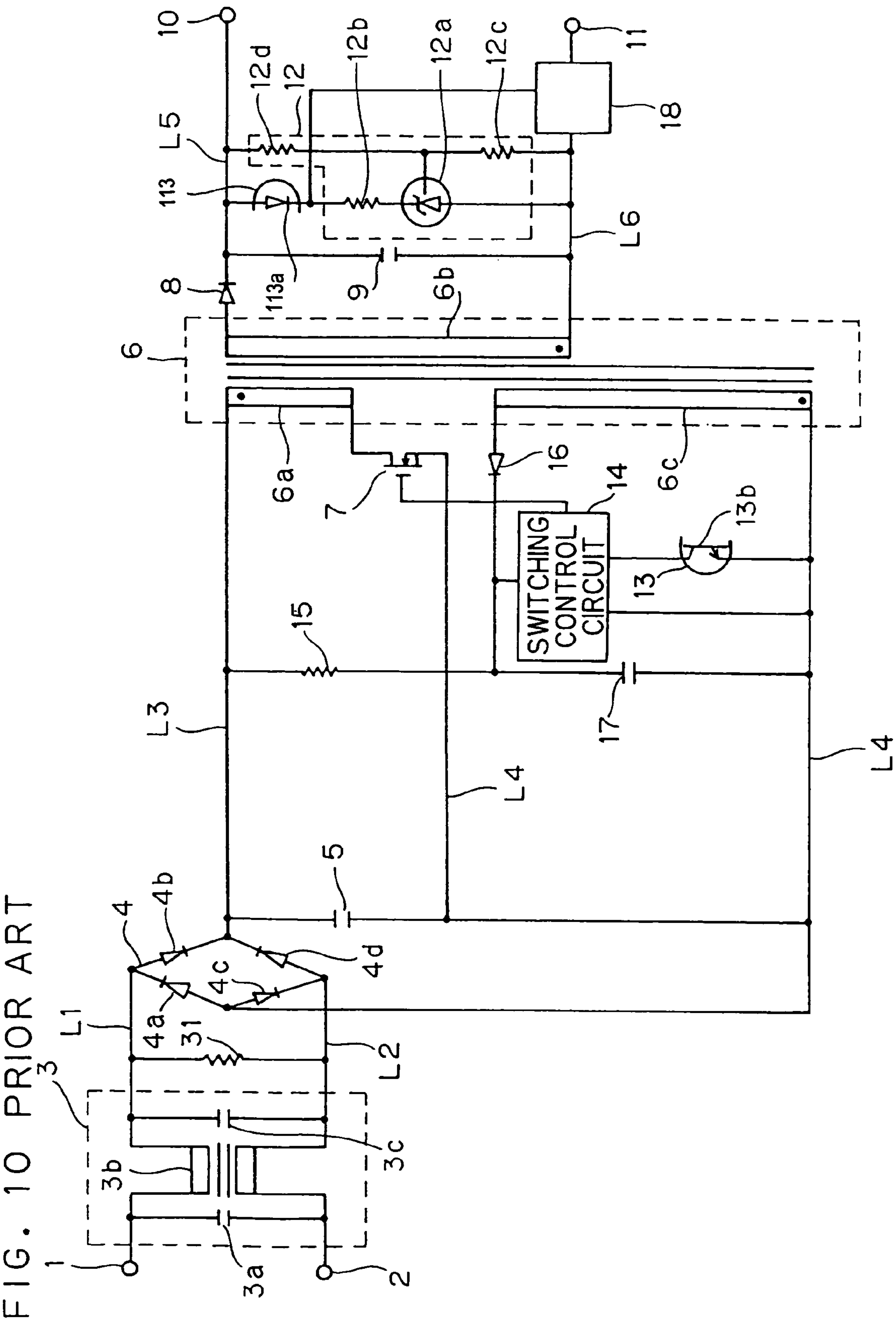
FIG. 10 is a circuit diagram of a conventional switching power supply apparatus.
Figures 11A, 11B, 11C:
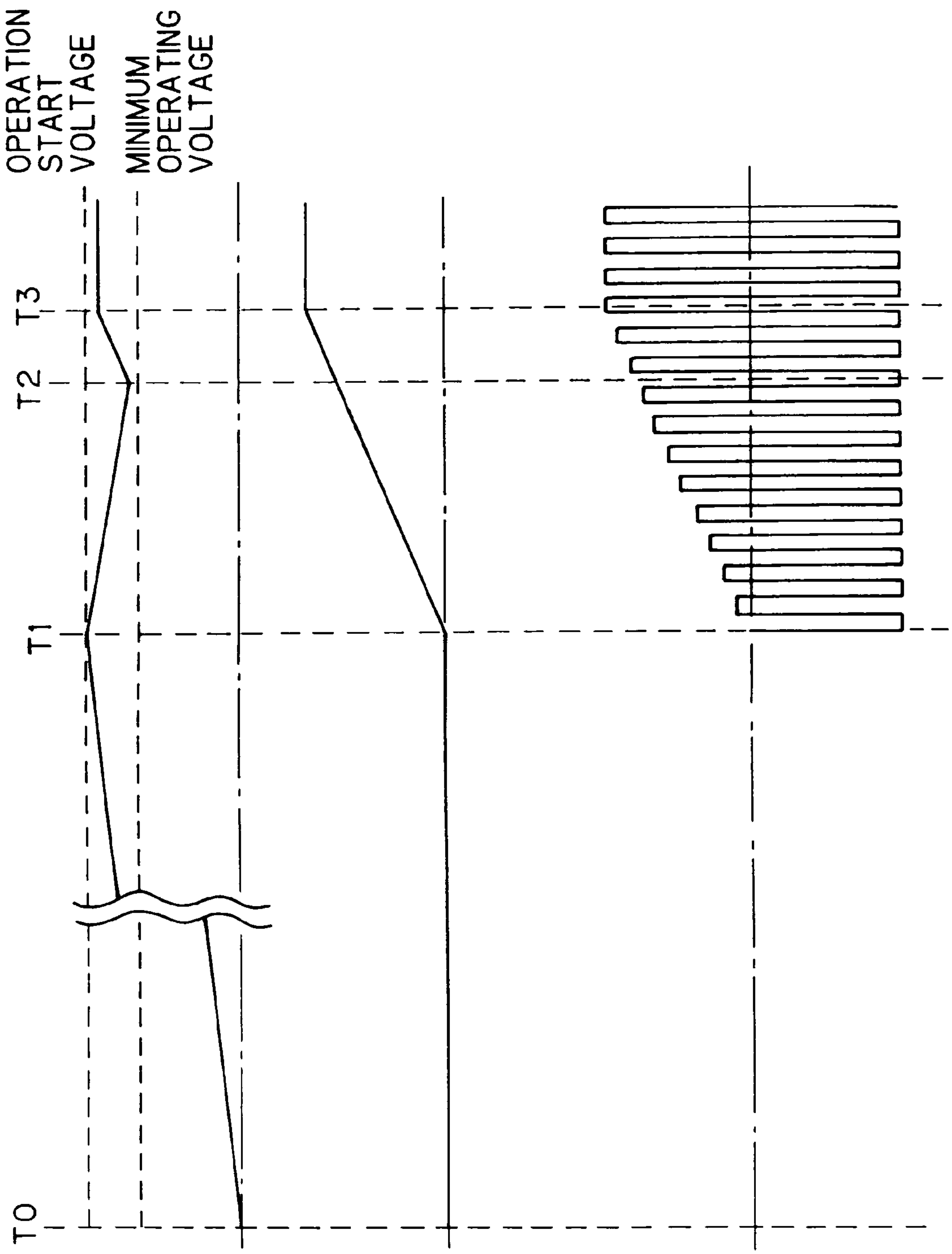
FIGS. 11A to 11C are voltage waveform diagrams illustrating the operation performed at start-up in a conventional switching power supply apparatus.
Figures 12A, 12B, 12C:
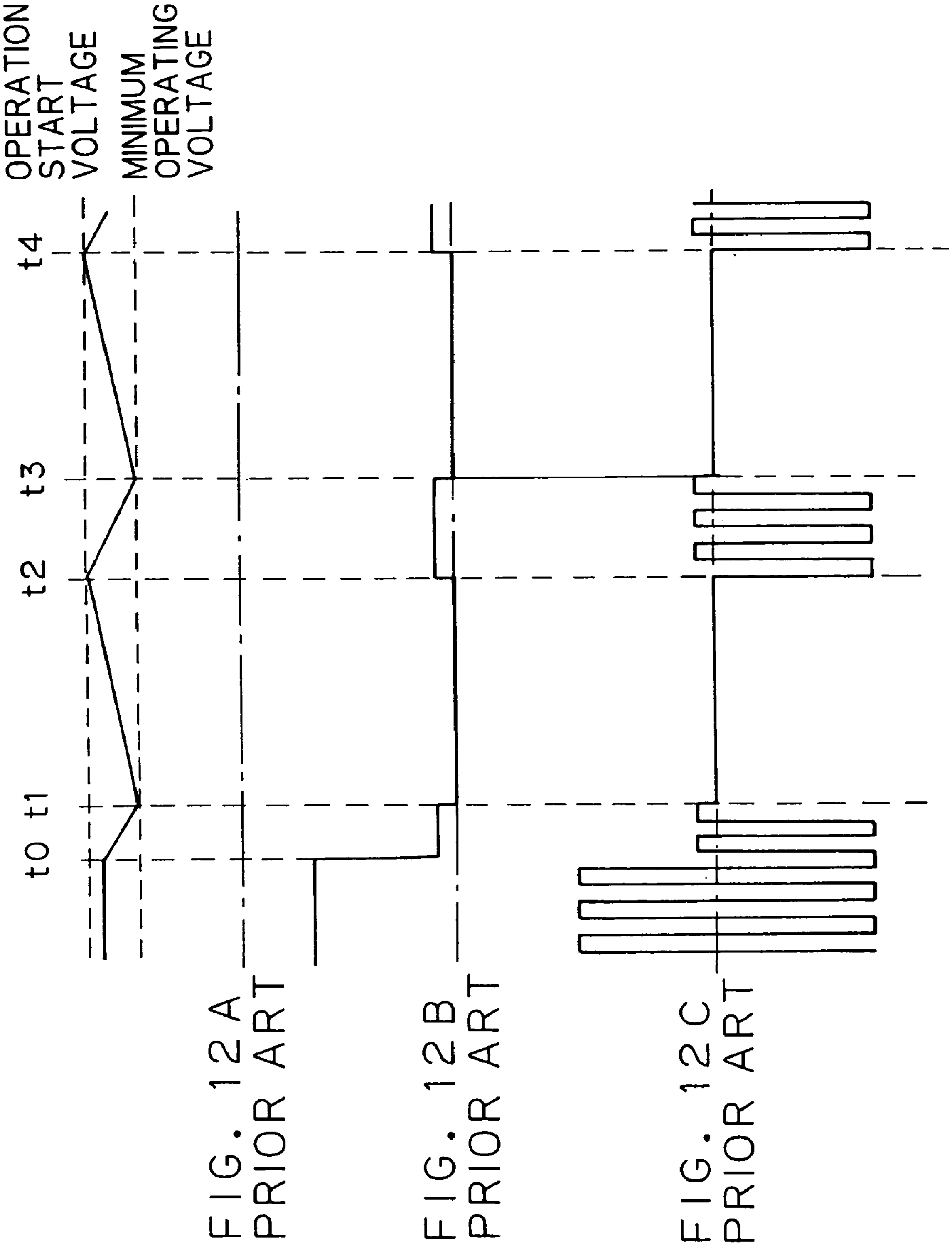
FIGS. 12A to 12C are voltage waveform diagrams illustrating the operation performed for overcurrent protection in a conventional switching power supply apparatus.

In the switching power supply apparatus of the first embodiment, irrespective of variation in the commercially distributed alternating-current voltage supplied via the alternating-current power input terminals 1 and 2, and thus irrespective of variation in the voltage between the positive and negative power supply lines L3 and L4, the constant current circuit 21 always feeds a constant start-up current to the capacitor 17, and this prevents variation in the ratio (see formula (3) noted earlier) of the switching operation period to the no-switching-operation period when the positive and negative output terminals 10 and 11 are short-circuited together (i.e., with the load short-circuited). As a result, even when the commercially distributed alternating-current voltage is high, and thus the voltage between the positive and negative power supply lines L3 and L4 is high, it never occurs that the start-up current fed through the start-up resistor 15 (see FIG. 10) increases, increasing the power consumption by the switching power supply apparatus and possibly leading to thermal destruction thereof, as experienced in a conventional switching power supply apparatus.

The conventional switching power supply apparatus described earlier has the characteristic that, when the load is short-circuited, the no-switching operation period is affected by variation in the input voltage. In particular, when the voltage of the input direct-current power is high, the power consumption by the switching power supply apparatus increases, possibly leading to thermal destruction thereof By contrast, the switching power supply apparatus of the first embodiment suppresses the power consumed when the voltage of the input direct-current power is high to almost equal to that consumed when the voltage is low. This reduces the risk of thermal destruction. This effect is particularly striking in a case where the capacitance of the power smoothing capacitor connected between the power-receiving terminals of the electronic appliance that receives power from the switching power supply apparatus is high. Moreover, the output current detection circuit 18 so operates as to reduce the power consumed by the switching power supply apparatus when the load is short-circuited. This further reduces the risk of thermal destruction.

Second Embodiment

Figure 2:
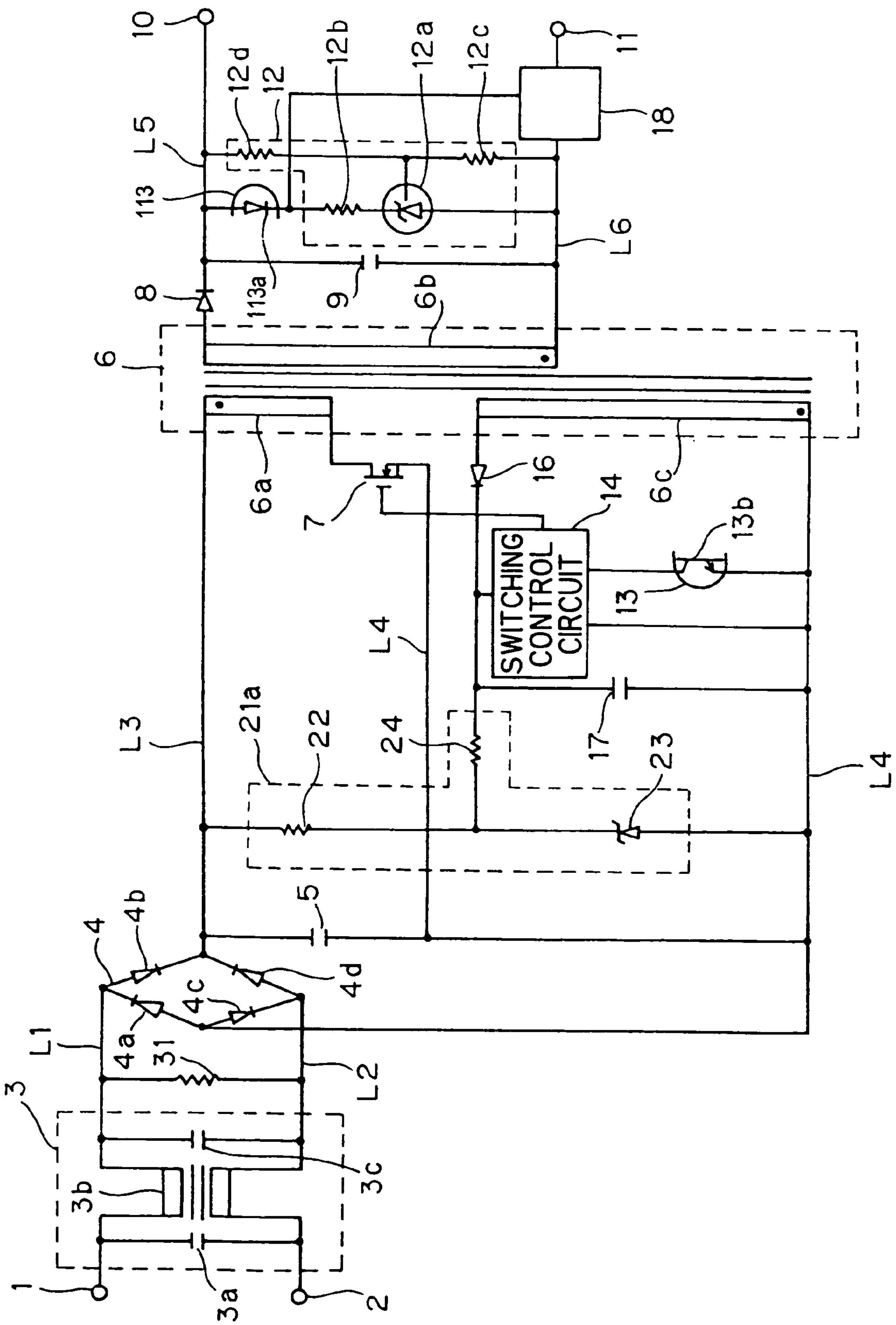
FIG. 2 is a circuit diagram of the switching power supply apparatus of a second embodiment of the invention.

FIG. 2 is a circuit diagram of the switching power supply apparatus of a second embodiment of the invention. In FIG. 2, such components as find their counterparts in FIG. 1 are identified with the same reference numerals and symbols, and their explanations will not be repeated.

The constant current circuit 21 a shown in FIG. 2 is a practically configured version of the constant current circuit 21 shown in FIG. 1. This constant current circuit 21 a includes a serial circuit composed of a resistor 22 and a Zener diode 23 and connected between the positive and negative power supply lines L3 and L4, and a resistor 24 of which one end is connected to the node between the resistor 22 and the Zener diode 23. The other end of the resistor 24 is connected to one end of the capacitor 17, to the positive power input terminal of the switching control circuit 14, and to the cathode of the diode 16.

The serial circuit composed of the resistor 22 and the Zener diode 23 constitutes a constant voltage circuit, and therefore the voltage at the node between the resistor 22 and the Zener diode 23 is always stable irrespective of the voltage between the positive and negative power supply lines L3 and L4. Accordingly, the start-up current that is fed from the node between the resistor 22 and the Zener diode 23 through the resistor 24 to the capacitor 17 is constant irrespective of the voltage between the positive and negative power supply lines L3 and L4.

In the switching power supply apparatus of the second embodiment, irrespective of variation in the commercially distributed alternating-current voltage supplied via the alternating-current power input terminals 1 and 2, and thus irrespective of variation in the voltage between the positive and negative power supply lines L3 and L4, the constant current circuit 21*a* always feeds a constant start-up current to the capacitor 17, and this prevents variation in the ratio (see formula (3) noted earlier) of the switching operation period to the no-switching-operation period when the positive and negative output terminals 10 and 11 are short-circuited together (i.e., with the load short-circuited). As a result, even when the commercially distributed alternating-current voltage is high, and thus the voltage between the positive and negative power supply lines L3 and L4 is high, it never occurs that the start-up current fed through the start-up resistor 15 (see FIG. 10) increases, increasing the power consumption by the switching power supply apparatus and possibly leading to thermal destruction thereof, as experienced in a conventional switching power supply apparatus.

The conventional switching power supply apparatus described earlier has the characteristic that, when the load is short-circuited, the no-switching operation period is affected by variation in the input voltage. In particular, when the voltage of the input direct-current power is high, the power consumption by the switching power supply apparatus increases, possibly leading to thermal destruction thereof. By contrast, the switching power supply apparatus of the second embodiment suppresses the power consumed when the voltage of the input direct-current power is high to almost equal to that consumed when the voltage is low. This reduces the risk of thermal destruction.

This effect is particularly striking in a case where the capacitance of the power smoothing capacitor connected between the power-receiving terminals of the electronic appliance that receives power from the switching power supply apparatus is high. Moreover, the output current detection circuit 18 so operates as to reduce the power consumed by the switching power supply apparatus when the load is short-circuited. This further reduces the risk of thermal destruction. Moreover, the constant current circuit 21*a* can be realized with a simple circuit configuration composed of resistors 22 and 24 and a Zener diode 23.

Third Embodiment

Figure 3:
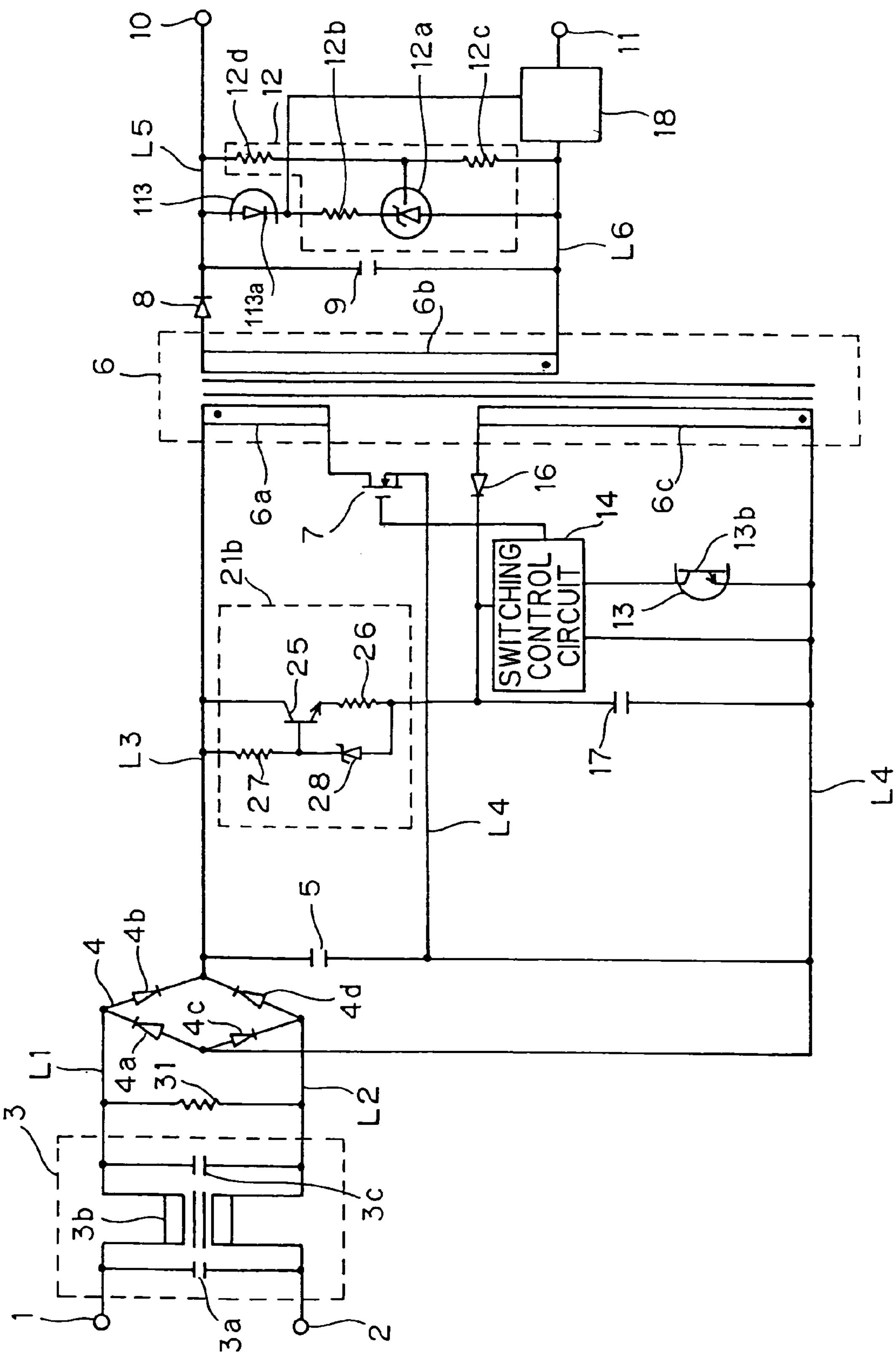
FIG. 3 is a circuit diagram of the switching power supply apparatus of a third embodiment of the invention.

FIG. 3 is a circuit diagram of the switching power supply apparatus of a third embodiment of the invention. In FIG. 3, such components as find their counterparts in FIG. 1 are identified with the same reference numerals and symbols, and their explanations will not be repeated.

The constant current circuit 21*b* shown in FIG. 3 is a practically configured version of the constant current circuit 21 shown in FIG. 1. This constant current circuit 21*b* is composed of a transistor 25, an emitter resistor 26, a bias resistor 27, and a Zener diode 28. The collector of the transistor 25 is connected to the positive power supply line L3, and the emitter of the transistor 25 is connected to one end of the emitter resistor 26. One end of the bias resistor 27 is connected to the positive power supply line L3, and the other end of the bias resistor 27 is connected to the base of the transistor 25 and to the cathode of the Zener diode 28. The anode of the Zener diode 28 is connected to the other end of the emitter resistor 26. The anode of the Zener diode 28 and the other end of the emitter resistor 26 are connected to one end of the capacitor 17, to the positive power input terminal of the switching control circuit 14, and to the cathode of the diode 16.

The bias resistor 27, the Zener diode 28, the transistor 25, and the emitter resistor 26 constitute a constant voltage circuit. Thus, the voltage between the base of the transistor 25 and the node between the emitter resistor 26 and the capacitor 17 is determined by the Zener voltage of the Zener diode 28 irrespective of the voltage between the positive and negative power supply lines L3 and L4.

Accordingly, by setting the current that flows through the Zener diode 28 smaller than the current that flows through the emitter resistor 26, it is possible to keep constant the start-up current fed from the positive power supply line L3 through the constant current circuit 21*b* to the capacitor 17 irrespective of the voltage between the positive and negative power supply lines L3 and L4.

The constant current circuit 21*b* used in the third embodiment is more complicated than the constant current circuit 21*a* shown in FIG. 2, but consumes less current. The effect of reducing power consumption is particularly striking, for example, when this configuration is adopted in a switching power supply apparatus that achieves reduction of power consumption by making the main switching device perform burst switching in a light-load state.

In the switching power supply apparatus of the third embodiment, irrespective of variation in the commercially distributed alternating-current voltage supplied via the alternating-current power input terminals 1 and 2, and thus irrespective of variation in the voltage between the positive and negative power supply lines L3 and L4, the constant current circuit 21*b* always feeds a constant start-up current to the capacitor 17, and this prevents variation in the ratio (see formula (3) noted earlier) of the switching operation period to the no-switching-operation period when the positive and negative output terminals 10 and 11 are short-circuited together (i.e., with the load short-circuited). As a result, even when the commercially distributed alternating-current voltage is high, and thus the voltage between the positive and negative power supply lines L3 and L4 is high, it never occurs that the start-up current fed through the start-up resistor 15 (see FIG. 10) increases, increasing the power consumption by the switching power supply apparatus and possibly leading to thermal destruction thereof, as experienced in a conventional switching power supply apparatus.

The conventional switching power supply apparatus described earlier has the characteristic that, when the load is short-circuited, the no-switching operation period is affected by variation in the input voltage. In particular, when the voltage of the input direct-current power is high, the power consumption by the switching power supply apparatus increases, possibly leading to thermal destruction thereof By contrast, the switching power supply apparatus of the third embodiment suppresses the power consumed when the voltage of the input direct-current power is high to almost equal to that consumed when the voltage is low. This reduces the risk of thermal destruction.

This effect is particularly striking in a case where the capacitance of the power smoothing capacitor connected between the power-receiving terminals of the electronic appliance that receives power from the switching power supply apparatus is high. Moreover, the output current detection circuit 18 so operates as to reduce the power consumed by the switching power supply apparatus when the load is short-circuited. This further reduces the risk of thermal destruction.

Moreover, the constant current circuit 21*b* has a slightly more complicated circuit configuration than the constant current circuit 21*a* shown in FIG. 2, but consumes less power. Since the constant current circuit 21*b* consumes little power, it is useful to minimize power consumption in a switching power supply apparatus that achieves reduction of power consumption by performing burst switching in a light-load state.

Fourth Embodiment

Figure 4:
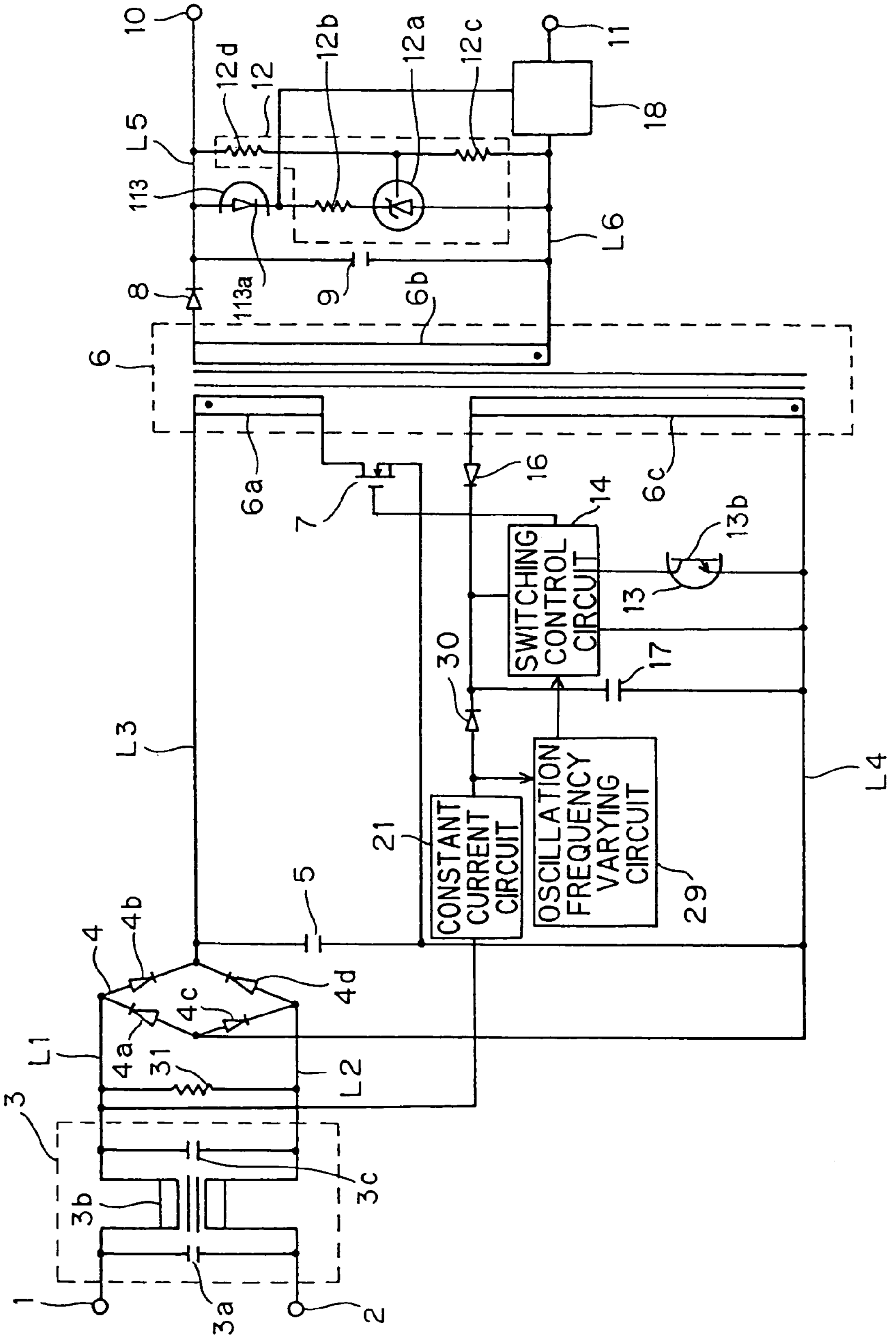
FIG. 4 is a circuit diagram of the switching power supply apparatus of a fourth embodiment of the invention.

FIG. 4 is a circuit diagram of the switching power supply apparatus of a fourth embodiment of the invention. In FIG. 4, such components as find their counterparts in FIG. 1 are identified with the same reference numerals and symbols, and their explanations will not be repeated.

In this switching power supply apparatus, the start-up current is fed from the line L1 of the commercially distributed alternating-current voltage through a constant current circuit 21 and a reverse current prevention diode 30 to the capacitor 17. Moreover, in this switching power supply apparatus, there is additionally provided an oscillation frequency varying circuit 29 that extracts the voltage at the node between the constant current circuit 21 and the reverse current prevention diode 30 and that, by using this voltage as a drive signal, varies the oscillation frequency of an oscillation circuit provided within the switching control circuit 14.

Figures 7A, 7B, 7C:
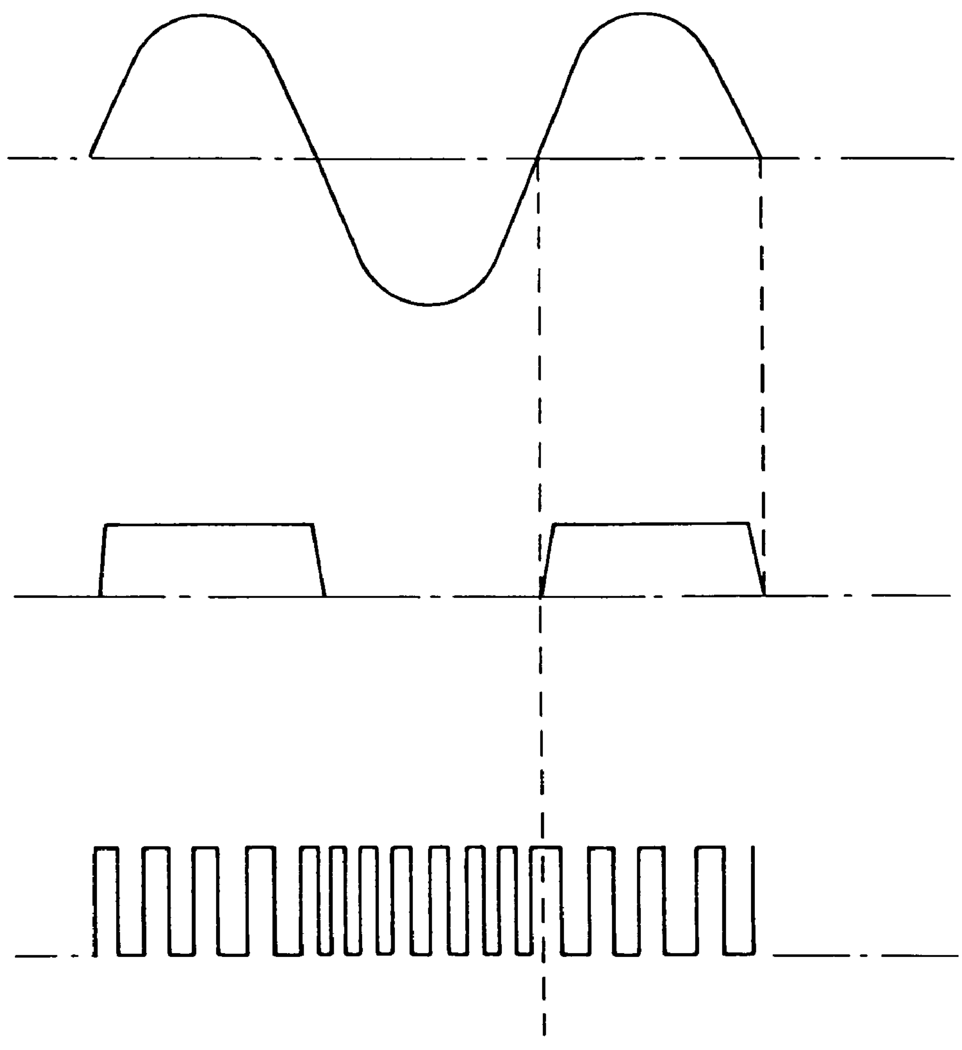
FIGS. 7A to 7C are voltage waveform diagrams illustrating the operation of the switching power supply apparatus of the fourth embodiment of the invention.

FIGS. 7A to 7C are voltage waveform diagrams illustrating the operation of this switching power supply apparatus. FIG. 7A shows the waveform of the commercially distributed alternating-current voltage between the lines L1 and L2 which is supplied from commercially distributed alternating-current power (not shown), FIG. 7B shows the waveform of the voltage at the node between the constant current circuit 21 and the reverse current prevention diode 30, and FIG. 7C shows the waveform of the gate voltage of the FET 7.

As the commercially distributed alternating-current voltage varies as shown in FIG. 7A, the voltage at the node between the constant current circuit 21 and the reverse current prevention diode 30 varies as shown in FIG. 7B. The variation in this voltage is exploited to control the operation of the switching power supply apparatus.

During the period in which the voltage at the node at which the constant current circuit 21 is connected to the line L1 is higher than the charge voltage Vcc of the capacitor 17, a current flows from the line L1 through the constant current circuit 21 and the reverse current prevention diode 30 to the capacitor 17, and thus the voltage at the node between the constant current circuit 21 and the reverse current prevention diode 30 is kept approximately equal to the charge voltage Vcc. By contrast, during the period in which the voltage on the line L1 is negative, no current flows from the line L1 through the constant current circuit 21 and the reverse current prevention diode 30 to the capacitor 17, and thus the voltage at the node between the constant current circuit 21 and the reverse current prevention diode 30 is zero volts.

The oscillation frequency varying circuit 29 receives the voltage at the node between the constant current circuit 21 and the reverse current prevention diode 30 (FIG. 7B), and, according to the voltage level of this voltage, varies the oscillation frequency of the switching control circuit 14. The resulting variation in the oscillation frequency can be observed as shown in FIG. 7C by monitoring the control voltage of the main switching device, i.e., the gate voltage of the FET 7. Specifically, the oscillation frequency varies stepwise every half cycle of the commercially distributed alternating-current power. This permits the spectrum of the noise radiated from the switching power supply apparatus to vary with time, and thus helps reduce the apparent noise level.

Here, reduction of the apparent noise level is achieved in the following manner. The noise radiated from the switching power supply apparatus mostly originates from high-order higher harmonics of the switching frequency and, by varying the switching frequency, the frequencies of the noise also vary, resulting in a reduced long-term average of the noise level measured in a given frequency band.

In the switching power supply apparatus of the fourth embodiment, irrespective of variation in the commercially distributed alternating-current voltage supplied via the alternating-current power input terminals 1 and 2, and thus irrespective of variation in the voltage between the positive and negative power supply lines L3 and L4, the constant current circuit 21 always feeds a constant start-up current to the capacitor 17, and this prevents variation in the ratio (see formula (3) noted earlier) of the switching operation period to the no-switching-operation period when the positive and negative output terminals 10 and 11 are short-circuited together (i.e., with the load short-circuited). As a result, even when the commercially distributed alternating-current voltage is high, and thus the voltage between the positive and negative power supply lines L3 and L4 is high, it never occurs that the start-up current fed through the start-up resistor 15 (see FIG. 10) increases, increasing the power consumption by the switching power supply apparatus and possibly leading to thermal destruction thereof, as experienced in a conventional switching power supply apparatus.

The conventional switching power supply apparatus described earlier has the characteristic that, when the load is short-circuited, the no-switching operation period is affected by variation in the input voltage. In particular, when the voltage of the input direct-current power is high, the power consumption by the switching power supply apparatus increases, possibly leading to thermal destruction thereof By contrast, the switching power supply apparatus of the fourth embodiment suppresses the power consumed when the voltage of the input direct-current power is high to almost equal to that consumed when the voltage is low. This reduces the risk of thermal destruction.

This effect is particularly striking in a case where the capacitance of the power smoothing capacitor connected between the power-receiving terminals of the electronic appliance that receives power from the switching power supply apparatus is high. Moreover, the output current detection circuit 18 so operates as to reduce the power consumed by the switching power supply apparatus when the load is short-circuited. This further reduces the risk of thermal destruction.

Moreover, in the switching power supply apparatus of the fourth embodiment, the voltage extracted from the node between the constant current circuit 21 and the reverse current prevention diode 30 varies according to variation in the commercially distributed alternating-current voltage, and thus can be exploited to control the operation of the switching power supply apparatus in synchronism with the alternation period of the commercially distributed alternating-current power. Moreover, by varying the switching frequency stepwise in synchronism with the alternation period of the commercially distributed alternating-current power, it is possible to apparently reduce the noise generated by the switching power supply apparatus.

Fifth Embodiment

Figure 5:
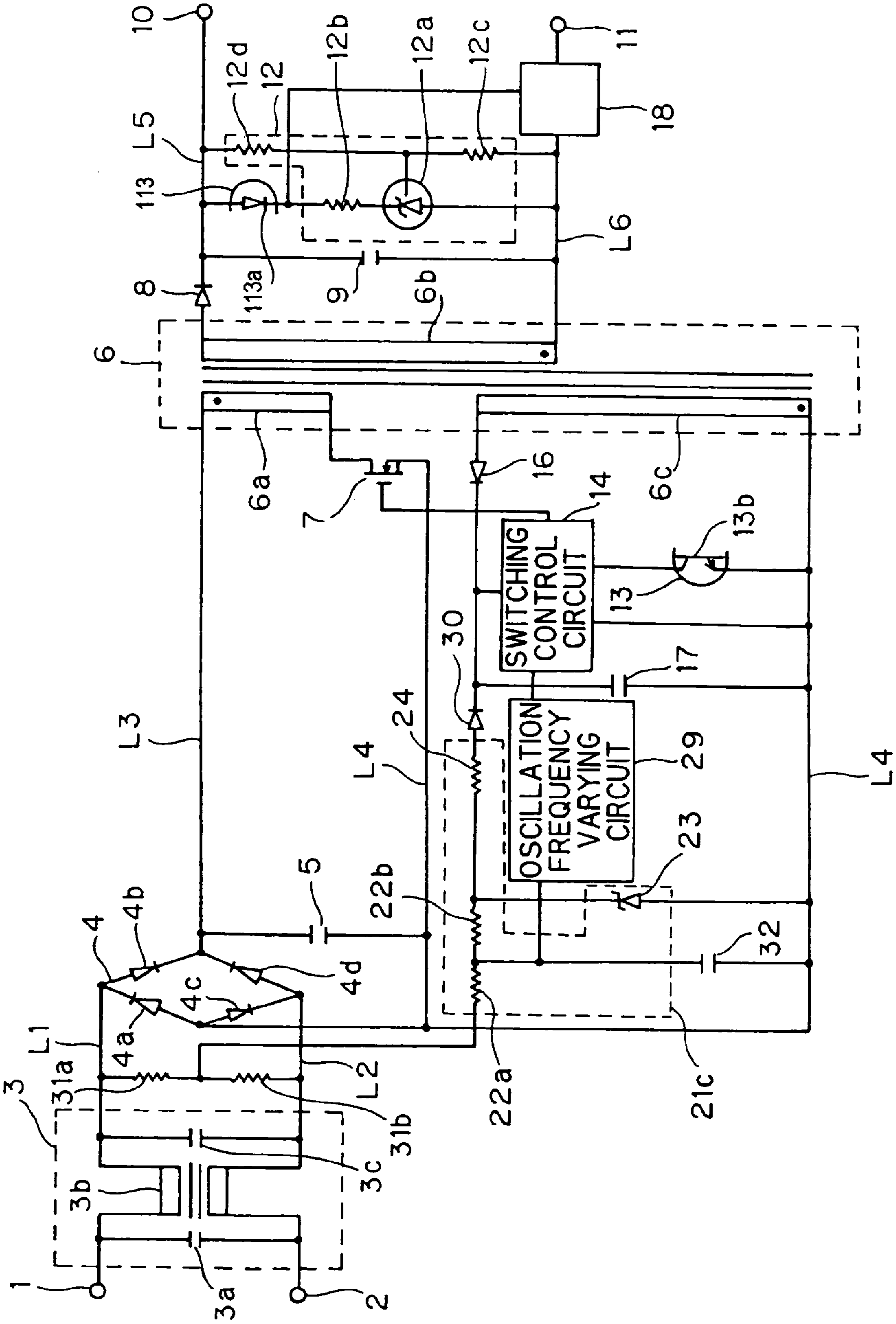
FIG. 5 is a circuit diagram of the switching power supply apparatus of a fifth embodiment of the invention.

FIG. 5 is a circuit diagram of the switching power supply apparatus of a fifth embodiment of the invention. In FIG. 5, such components as find their counterparts in FIG. 1 are identified with the same reference numerals and symbols, and their explanations will not be repeated.

In this switching power supply apparatus, there is additionally provided a serial circuit composed of discharge resistors 31*a* and 31*b* and connected between the lines L1 and L2 by way of which an alternating voltage is supplied from the commercially distributed alternating-current power (not shown), and the start-up current is fed from the node between the discharge resistors 31*a* and 31*b* through a serial circuit composed of a constant current circuit 21*c* and a reverse current prevention diode 30 to the switching control circuit 14.

The constant current circuit 21*c* is composed of resistors 22*a*, 22*b*, and 24, and a Zener diode 23. One end of the resistor 22*a* is connected to the node between the discharge resistors 31*a* and 31*b*, and the other end of the resistor 22*a* is connected to one end of the resistor 22*b* and to one end of a capacitor 32. The other end of the capacitor 32 is connected to the line L4. The other end of the resistor 22*b* is connected to the cathode of the Zener diode 23 and to one end of the resistor 24. The other end of the resistor 24 is connected to the anode of the reverse current prevention diode 30.

Figures 8A, 8B, 8C, 8D, 8E:
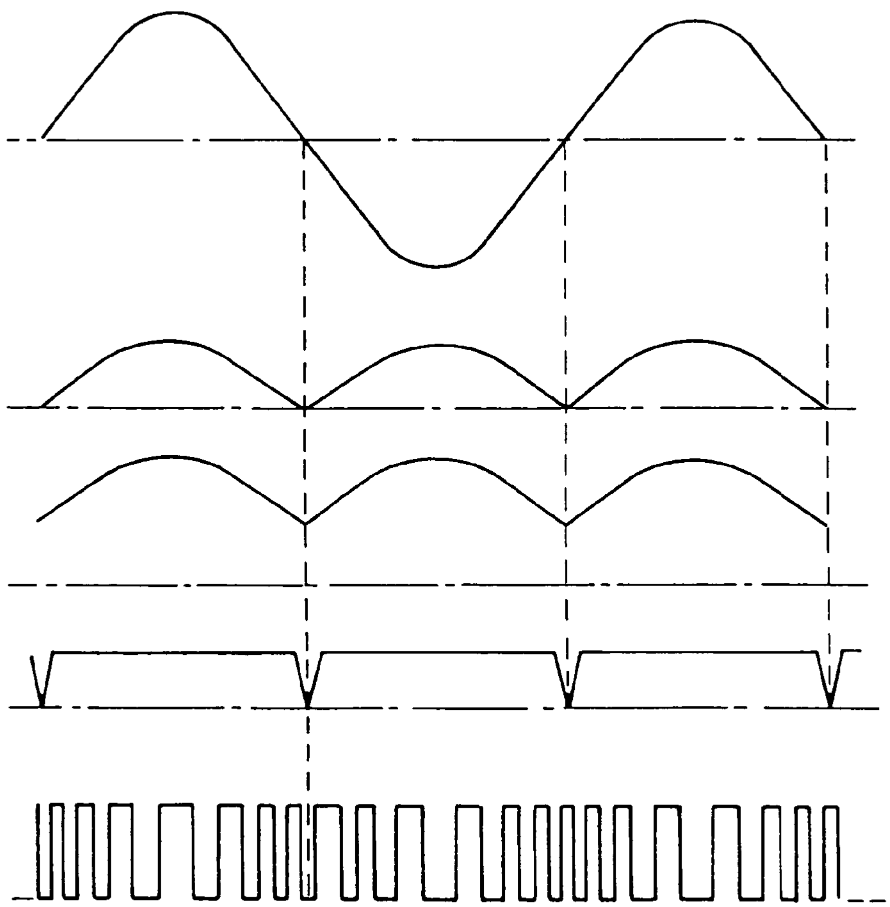
FIGS. 8A to 8E are voltage waveform diagrams illustrating the operation of the switching power supply apparatus of the fifth embodiment of the invention.

As shown in FIG. 8D, during the period in which the voltage at the node between the discharge resistors 31*a* and 31*b* is higher than the Zener voltage of the Zener diode 23, the cathode voltage of the Zener diode 23 of the constant current circuit 21*c* is stably kept equal to the Zener voltage; during the period in which the voltage at the node between the discharge resistors 31*a* and 31*b* is lower than the Zener voltage of the Zener diode 23, the cathode voltage of the Zener diode 23 has a level lower than the Zener voltage.

By setting the Zener voltage of the Zener diode 23 as low as possible but still higher than the operation start voltage of the switching control circuit 14, it is possible to make neglectably short the period in which the cathode voltage of the Zener diode 23 is lower than the Zener voltage of the Zener diode 23. This prevents the start-up current fed through the resistor 24 and the reverse current prevention diode 30 to the capacitor 17 form being affected by the voltage of the commercially distributed alternating-current power.

Thus, also in this embodiment, even when the commercially distributed alternating-current voltage is high, and thus the voltage between the positive and negative power supply lines L3 and L4 is high, it never occurs that the start-up current fed through the start-up resistor 15 (see FIG. 10) increases, increasing the power consumption by the switching power supply apparatus and possibly leading to thermal destruction thereof, as experienced in a conventional switching power supply apparatus.

FIGS. 8A to 8E are voltage waveform diagrams illustrating the operation of this switching power supply apparatus. FIG. 8A shows the waveform of the voltage of the commercially distributed alternating-current power, FIG. 8B shows the waveform of the voltage at the node between the discharge resistors 31*a* and 31*b*, FIG. 8C shows the waveform of the voltage at the node between the resistors 22*a* and 22*b*, FIG. 8D shows the waveform of the cathode voltage of the Zener diode 23, and FIG. 8E shows the waveform of the gate voltage of the FET 7.

The voltage at the node between the resistors 22*a* and 22*b* is somewhat smoothed by the capacitor 32 so as to have a parabolic waveform as shown in FIG. 8C. The oscillation frequency varying circuit 29 receives this voltage having a parabolic waveform as shown in FIG. 8C, and, according to the voltage level of this voltage, varies the oscillation frequency of the switching control circuit 14. The resulting variation in the oscillation frequency can be observed as shown in FIG. 8E by monitoring the control voltage of the main switching device (in the circuit shown in FIG. 5, the gate voltage of the FET 7). Here, as opposed to in the fourth embodiment described above, the oscillation frequency is varied continuously.

Thus, the switching power supply apparatus of this embodiment has a slightly more complicated circuit configuration than that of the fourth embodiment described above, but permits the spectrum of the noise radiated from the switching power supply apparatus to be spread more widely over time, and thus helps reduce the apparent noise level. Moreover, feeding the start-up current from the node between the discharge resistors 31*a* and 31*b* helps reduce the power consumed by the start-up current feeding circuit section.

In the switching power supply apparatus of the fifth embodiment, irrespective of variation in the commercially distributed alternating-current voltage supplied via the alternating-current power input terminals 1 and 2, and thus irrespective of variation in the voltage between the positive and negative power supply lines L3 and L4, the constant current circuit 21*c* always feeds a constant start-up current to the capacitor 17, and this prevents variation in the ratio (see formula (3) noted earlier) of the switching operation period to the no-switching-operation period when the positive and negative output terminals 10 and 11 are short-circuited together (i.e., with the load short-circuited). As a result, even when the commercially distributed alternating-current voltage is high, and thus the voltage between the positive and negative power supply lines L3 and L4 is high, it never occurs that the start-up current fed through the start-up resistor 15 (see FIG. 10) increases, increasing the power consumption by the switching power supply apparatus and possibly leading to thermal destruction thereof, as experienced in a conventional switching power supply apparatus.

The conventional switching power supply apparatus described earlier has the characteristic that, when the load is short-circuited, the no-switching operation period is affected by variation in the input voltage. In particular, when the voltage of the input direct-current power is high, the power consumption by the switching power supply apparatus increases, possibly leading to thermal destruction thereof. By contrast, the switching power supply apparatus of the fifth embodiment suppresses the power consumed when the voltage of the input direct-current power is high to almost equal to that consumed when the voltage is low. This reduces the risk of thermal destruction.

This effect is particularly striking in a case where the capacitance of the power smoothing capacitor connected between the power-receiving terminals of the electronic appliance that receives power from the switching power supply apparatus is high. Moreover, the output current detection circuit 18 so operates as to reduce the power consumed by the switching power supply apparatus when the load is short-circuited. This further reduces the risk of thermal destruction.

Moreover, in the switching power supply apparatus of the fifth embodiment, a current is fed from the node between the discharge resistors 31*a* and 31*b* to the start-up circuit section (the circuit section that feeds the capacitor 17). This helps reduce the power loss in the start-up circuit section. Moreover, the voltage extracted from the node between the resistors 22*a* and 22*b* varies according to variation in the commercially distributed alternating-current voltage, and thus can be exploited to control the operation of the switching power supply apparatus in synchronism with the alternation period of the commercially distributed alternating-current power. Moreover, by varying the switching frequency continuously in synchronism with the alternation period of the commercially distributed alternating-current power, it is possible to more widely spread the noise spectrum than in the fourth embodiment and thereby apparently further reduce the noise generated by the switching power supply apparatus.

Sixth Embodiment

Figure 6:
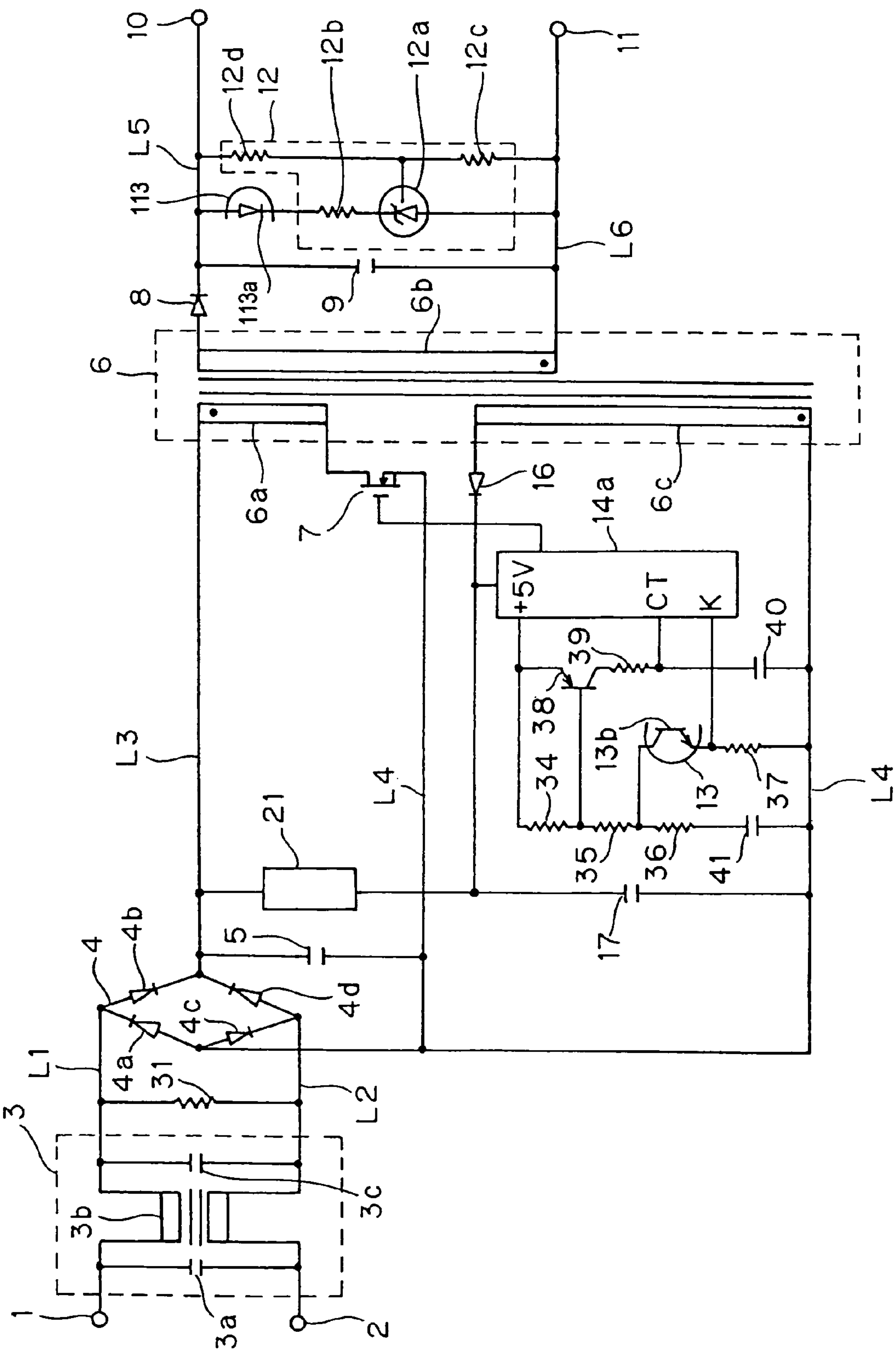
FIG. 6 is a circuit diagram of the switching power supply apparatus of a sixth embodiment of the invention.

FIG. 6 is a circuit diagram of the switching power supply apparatus of a sixth embodiment of the invention. In FIG. 6, such components as find their counterparts in FIG. 1 are identified with the same reference numerals and symbols, and their explanations will not be repeated.

In the switching power supply apparatus of the sixth embodiment, the output current detection circuit 18 used in the embodiments described thus far is omitted, and instead another system is used that intermittently stops the switching operation of the switching power supply apparatus when the load is short-circuited.

A switching control circuit 14*a* has a +5V terminal thereof connected to the emitter of a transistor (PNP-type transistor) 38 and to one end of a resistor 34, and has a CT terminal thereof connected to one end of a resistor 39 and to one end of a capacitor 40. The other end of the resistor 34 is connected to the base of the transistor 38 and to one end of a resistor 35. The other end of the resistor 39 is connected to the collector of the transistor 38, and the other end of the capacitor 40 is connected to the line L4. The other end of the resistor 35 is connected through a resistor 36 and a capacitor 41 to the line L4, and is also connected to the collector of the phototransistor 13*b* of the photocoupler 13. The emitter of the phototransistor 13*b* is connected through a resistor 37 to the line L4, and is also connected to the K terminal of the switching control circuit 14*a*. The output terminal of the switching control circuit 14*a* is connected to the gate of the FET 7.

First, how this switching power supply apparatus controls its output voltage will be described. When the voltage between the positive and negative output terminals 10 and 11 increases, the output voltage detection circuit 12 compares the voltage obtained from the output voltage division circuit composed of the resistors 12*c* and 12*d* with a reference voltage previously set in the shunt regulator 12*a*. As a result, the output voltage detection circuit 12 increases the currents through the photodiode 113*a* and the phototransistor 13*b* of the photocoupler 13 and thereby increases the voltage at the node between the phototransistor 13*b* and the resistor 37.

The switching control circuit 14*a*, when it receives the increase in this voltage at the K terminal thereof, controls the switching timing of the FET 7, i.e., the main switching device, so as to decrease the output power of the switching power supply apparatus and thereby suppresses the increase in the output voltage of the switching power supply apparatus.

On the other hand, when the voltage between the positive and negative output terminals 10 and 11 decreases, the output voltage detection circuit 12, as a result of a similar comparison operation as described above, decreases the currents through the photodiode 113*a* and the phototransistor 13*b* and thereby decreases the voltage at the node between the emitter of the phototransistor 13*b* and the resistor 37.

The switching control circuit 14*a*, when it receives the decrease in this voltage at the K terminal thereof, controls the switching timing of the FET 7 so as to increase the output power of the switching power supply apparatus and thereby suppresses the decrease in the output voltage of the switching power supply apparatus. Moreover, while performing control operation, the switching control circuit 14*a* outputs +5V power via the +5V terminal thereof so that a current is fed from the +5V terminal through the resistors 34 and 35 to the phototransistor 13*b*. This makes the aforementioned output voltage stabilizing operation possible.

Moreover, the +5V power mentioned above is used also to control the oscillation frequency of the switching control circuit 14*a*. When the current through the phototransistor 13*b* flows from the emitter to the base of the transistor 38 and then through the resistor 35, the transistor 38 is turned on, and then gradually charges the capacitor 40 through the resistor 39.

The charge voltage of the capacitor 40 is detected via the CT terminal of the switching control circuit 14*a*. When this charge voltage reaches a predetermined high level, it is extracted (discharged) by the operation of an internal circuit of the switching control circuit 14*a* until reduced to a predetermined low level, when the extracting operation is stopped. Thereafter, the capacitor 40 is gradually charged again by the current fed through the transistor 38 and the resistor 39 until the charge voltage reaches the predetermined high level, when it is discharged by the operation of the internal circuit of the switching control circuit 14*a* as described above. These operations are repeated to achieve oscillation.

The serial circuit that is composed of the resistor 36 and the capacitor 41 and that is connected between the collector of the phototransistor 13*b* and the negative power supply line L4 serves, as described below, to guarantee that the switching power supply apparatus starts up.

Specifically, when the switching power supply apparatus starts up, a current is fed from the positive power supply line L3 through the constant current circuit 21 to the capacitor 17. When the charge voltage of the capacitor 17 reaches the operation start voltage of the switching control circuit 14*a*, the switching control circuit 14*a* starts to operate. Now, the switching control circuit 14*a* outputs a +5V voltage via the +5V terminal thereof and thereby gradually charges the capacitor 41 through the emitter and base of the transistor 38, the resistor 35, and the resistor 36.

Accordingly, the transistor 38 is turned on and feeds a current through the resistor 39 to the capacitor 40 to start oscillation. According to the oscillation signal resulting from this oscillation, the switching control circuit 14*a* produces a switching control signal and feeds it to the gate of the FET 7, so that the switching power supply apparatus starts outputting a voltage.

Here, when the switching power supply apparatus starts to start up, its output voltage is zero volts or a low level. Accordingly, the output voltage detection circuit 12 feeds no current to the photodiode 113*a*, and thus no current flows through the phototransistor 13*b*. Hence, as described above, the transistor 38 is turned on by the charge current of the capacitor 41, so that oscillation is continued.

Thereafter, when the output voltage of the switching power supply apparatus increases to a predetermined voltage level, and a current starts to flow through the phototransistor 13*b*, the transistor 38, by using this current, maintains the oscillation of the switching control circuit 14*a*. Accordingly, the transistor 38 needs to be kept on at least until the output voltage of the switching power supply apparatus increases to the predetermined voltage level, and therefore the capacitor 41 is given a sufficiently high capacitance to achieve that.

Also in this embodiment, to ensure that the switching power supply apparatus starts up, the capacitor 17 needs to meet the above requirement, and thus needs to be given a sufficiently high capacitance.

Next, the operation that the switching power supply apparatus performs when the load is short-circuited will be described.

Figures 9A, 9B, 9C, 9D:
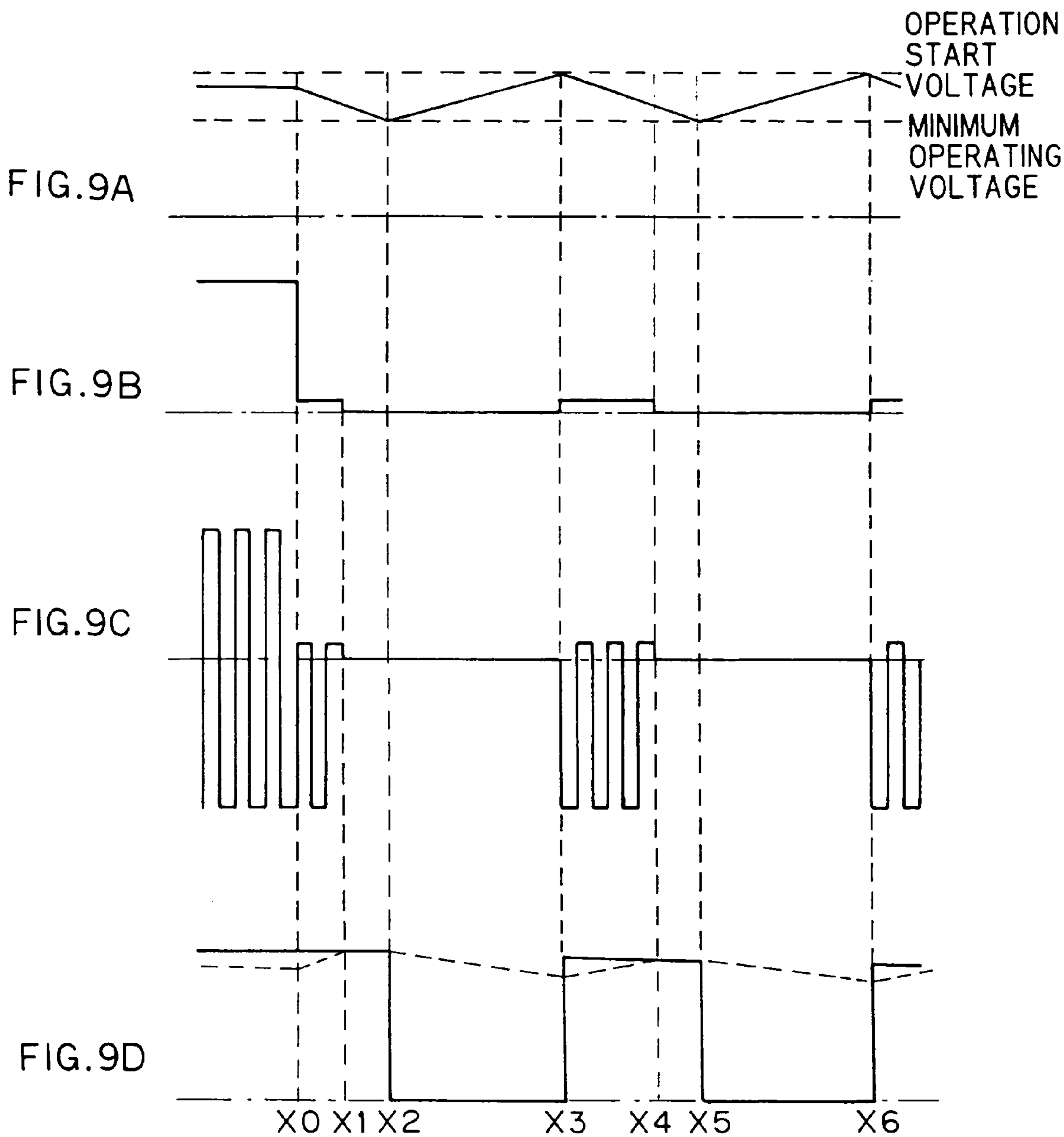
FIGS. 9A to 9D are voltage waveform diagrams illustrating the operation performed for overcurrent protection in the switching power supply apparatus of the sixth embodiment of the invention.

FIGS. 9A to 9D are voltage waveform diagrams illustrating the operation preformed for overcurrent protection in this switching power supply apparatus. FIG. 9A shows the waveform of the charge voltage Vcc of the capacitor 17, FIG. 9B shows the waveform of the output voltage of the switching power supply apparatus, and FIG. 9C shows the waveform of the voltage on the auxiliary coil 6*c* of the transformer 6. In FIG. 9D, the waveform indicated by a solid line is that of the voltage at the +5V terminal of the switching control circuit 14*a*, and the waveform indicated by a broken line is that of the voltage at the node between the capacitor 41 and the resistor 36 (i.e., the waveform of the charge voltage of the capacitor 41).

As shown in FIGS. 9A to 9D, before a time point X0, when the switching power supply apparatus is operating in the steady state, the current that flows through the phototransistor 13*b* keeps the voltage at the node between the resistors 35 and 36 at a level lower than the voltage output via the +5V terminal of the switching control circuit 14*a*. Accordingly, as indicated by the broken line in FIG. 9D, the capacitor 41 is charged to a voltage lower than the voltage output via the +5V terminal.

When, at the time point X0, the positive and negative output terminals 10 and 11 of the switching power supply apparatus are short-circuited together, and the output voltage decreases, the output voltage detection circuit 12 so controls as to stop the current through the phototransistor 13*b*. Thus, the charge voltage of the capacitor 41 starts to increase owing to the charge current fed from the +5V terminal of the switching control circuit 14*a* through the emitter and base of the transistor 38 and the resistors 35 and 36.

When, at a time point X1, the charge voltage of the capacitor 41 reaches the level of the voltage output via the +5V terminal of the switching control circuit 14*a*, the base current of the transistor 38 ceases to flow. This turns the transistor 38 off, and thus stops the supply of a current to the serial circuit composed of the resistor 39 and the capacitor 40. As a result, oscillation stops, and the switching power supply apparatus stops switching operation.

Whereas, in all the embodiments described earlier, switching operation is continued until the charge voltage Vcc of the capacitor 17 reaches the minimum operating voltage, in this embodiment, switching operation is stopped before the charge voltage Vcc of the capacitor 17 reaches the minimum operating voltage. As will be described later, this helps shorten the switching operation period Ton when the load is short-circuited, and thus helps accordingly reduce the power consumption by the switching power supply apparatus.

After the time point X0, as described earlier, the positive induced voltage that appears in the auxiliary coil 6*c* of the transformer 6 decreases, and thus the charge voltage Vcc of the capacitor 17 starts to decrease. Even after the time point X1, the switching control circuit 14*a* still consumes an operating current, and this current is larger than the current fed from the constant current circuit 21. Thus, the charge voltage Vcc continues to decrease until, at a time point X2, it reaches the minimum operating voltage, when the switching control circuit 14*a* stops operating, and the voltage ceases to be output via the +5V terminal.

When the switching control circuit 14*a* is not operating, the +5V terminal thereof has a low internal impedance, and thus acts to extract the charge voltage of the capacitor 41 through the resistors 36, 35, and 34. Accordingly, after the time point X2, the charge voltage of the capacitor 41 starts to decrease (see FIG. 9D).

As described earlier, the current consumed by the switching control circuit 14*a* decreases when it stops operating. Thus, the charge voltage Vcc of the capacitor 17 starts to increase owing to the current fed from the positive power supply line L3 through the constant current circuit 21 until, at a time point X3, it reaches the level of the operation start voltage of the switching power supply apparatus, when the switching control circuit 14*a* starts to operate and thus raises the voltage output via the +5V terminal thereof.

Accordingly, a charge current flows through the capacitor 41 via the route described above. This turns the transistor 38 on, and thus oscillation starts. As a result, the power consumption by the switching control circuit 14*a* increases, and thus the charge voltage of the capacitor 17 starts to decrease.

On the other hand, as described earlier, when the load is short-circuited, no current flows through the phototransistor 13*b*, and therefore the capacitor 41 is gradually charged. When, at a time point X4, its charge voltage reaches the level of the voltage output via the +5V terminal of the switching control circuit 14*a*, the base current of the transistor 38 ceases to flow. This turns the transistor 38 off, and thus stops the supply of a current to the serial circuit composed of the resistor 39 and the capacitor 40. As a result, oscillation stops, and the switching power supply apparatus stops switching operation.

Whereas, in all the embodiments described earlier, switching operation is continued until the charge voltage Vcc of the capacitor 17 reaches the minimum operating voltage, in this embodiment, switching operation is stopped before the charge voltage Vcc of the capacitor 17 reaches the minimum operating voltage. This helps shorten the switching operation period Ton when the load is short-circuited, and thus helps accordingly reduce the power consumption by the switching power supply apparatus.

After the time point X4, as described earlier, the positive induced voltage that appears in the auxiliary coil 6*c* of the transformer 6 is low, and thus the charge voltage Vcc of the capacitor 17 starts to decrease. Even after the time point X4, the switching control circuit 14*a* still consumes an operating current, and this current is larger than the current fed from the constant current circuit 21. Thus, the charge voltage Vcc continues to decrease until, at a time point X5, it reaches the minimum operating voltage, when the switching control circuit 14*a* stops operating, and the voltage ceases to be output via the +5V terminal.

When the switching control circuit 14*a* is not operating, the +5V terminal thereof has a low internal impedance, and thus acts to extract the charge voltage of the capacitor 41 through the resistors 36, 35, and 34. Thereafter, as long as the load of the switching power supply apparatus remains short-circuited, the operations described above that are performed during the period from the time point X2 to the time point X5 are repeated.

Also in this embodiment, as in the embodiments described earlier, the constant current circuit 21 prevents the period from the time point X2 to the time point X3 from being affected by variation in the voltage between the positive and negative power supply lines L3 and L4. This helps make the power consumption by the switching power supply apparatus when the commercially distributed alternating-current voltage supplied thereto is high approximately equal to that consumed when the commercially distributed alternating-current voltage is low, and thus helps reduce the risk of the switching power supply apparatus being destroyed.

In the switching power supply apparatus of the sixth embodiment, irrespective of variation in the commercially distributed alternating-current voltage supplied via the alternating-current power input terminals 1 and 2, and thus irrespective of variation in the voltage between the positive and negative power supply lines L3 and L4, the constant current circuit 21 always feeds a constant start-up current to the capacitor 17, and this prevents variation in the ratio of the switching operation period to the no-switching-operation period when the positive and negative output terminals 10 and 11 are short-circuited together (i.e., with the load short-circuited). As a result, even when the commercially distributed alternating-current voltage is high, and thus the voltage between the positive and negative power supply lines L3 and L4 is high, it never occurs that the start-up current fed through the start-up resistor 15 (see FIG. 10) increases, increasing the power consumption by the switching power supply apparatus and possibly leading to thermal destruction thereof, as experienced in a conventional switching power supply apparatus.

The conventional switching power supply apparatus described earlier has the characteristic that, when the load is short-circuited, the no-switching operation period is affected by variation in the input voltage. In particular, when the voltage of the input direct-current power is high, the power consumption by the switching power supply apparatus increases, possibly leading to thermal destruction thereof By contrast, the switching power supply apparatus of the sixth embodiment suppresses the power consumed when the voltage of the input direct-current power is high to almost equal to that consumed when the voltage is low. This reduces the risk of thermal destruction. This effect is particularly striking in a case where the power smoothing capacitor connected between the power-receiving terminals of the electronic appliance that receives power from the switching power supply apparatus is high.

Moreover, the switching power supply apparatus of the sixth embodiment can be applied to an overcurrent protection system that is so configured that, when the load is short-circuited, a decrease in the current through the photocoupler 13 is detected to stop switching operation before the charge voltage Vcc of the capacitor 17 decreases to the minimum operating voltage.

The switching power supply apparatus of the sixth embodiment has a simpler circuit configuration and is more inexpensive to produce than those adopting a current detection circuit like those of the other embodiments. In a switching power supply apparatus that is so configured that a resistor for detecting a voltage drop in the output is connected on the output line of the switching power supply apparatus and a voltage drop in the output is detected by means of that resistor, the resistor produces a power loss. By contrast, in the switching power supply apparatus of the sixth embodiment, no such power loss is produced.

As described hereinbefore, according to one aspect of the present invention, a switching power supply apparatus has a serial circuit, including the primary coil of a transformer and a main switching device, connected between a positive and a negative power supply line connected to direct-current power produced from commercially distributed alternating-current power. The switching power supply apparatus outputs a direct-current voltage obtained by rectifying and smoothing a high-frequency voltage induced in the secondary coil of the transformer by the main switching device performing switching operation. Here, the switching power supply apparatus further includes: a constant current circuit that feeds a constant current to a switching control circuit for controlling the main switching device even when the alternating-current voltage of the commercially distributed alternating-current power varies.

With this configuration, even when the voltage of the commercially distributed alternating-current power varies, the switching control circuit is fed with a constant current from the constant current circuit. This permits the power consumed with the load short-circuited when the input voltage from the commercially distributed alternating-current power is high to be approximated to that consumed when the input voltage is low. Thus, it is possible to prevent thermal destruction even if the load remains short-circuited for a long time when the input voltage from the commercially distributed alternating-current power is high.

According to another aspect of the present invention, a switching power supply apparatus has a serial circuit, including the primary coil of a transformer and a main switching device, connected between a positive and a negative power supply line connected to direct-current power produced from commercially distributed alternating-current power. The switching power supply apparatus outputs, via a positive and a negative output terminal, a direct-current voltage obtained by rectifying and smoothing with a rectifying/smoothing circuit a high-frequency voltage induced in the secondary coil of the transformer by the main switching device performing switching operation. Here, the switching power supply apparatus further includes: an output voltage detection circuit that detects the voltage between the positive and negative output terminals; a switching control circuit that controls the switching operation of the main switching device according to detection information from the output voltage detection circuit; a steady-state operation power supply circuit that feeds the switching control circuit with operating power produced by rectifying and smoothing the voltage that is induced in the auxiliary coil of the transformer substantially in proportion to the output voltage between the positive and negative output terminals during steady-state operation; and a constant current circuit that receives a current from the direct-current power or the commercially distributed alternating-current power at start up to feed the switching control circuit with a constant start-up current.

With this configuration, when the load connected between the positive and negative output terminals is, for example, short-circuited, this short-circuited state is detected by the output voltage detection circuit, and the switching control circuit stops operating. At start-up, a current from the direct-current power or the commercially distributed alternating-current power is fed, as a start-up current, through the constant current circuit to the switching control circuit.

Accordingly, even when the voltage of the commercially distributed alternating-current power becomes high, the switching control circuit is fed with a constant current from the constant current circuit. This permits the power consumed with the load short-circuited when the input voltage from the commercially distributed alternating-current power is high to be approximated to that consumed when the input voltage is low. Thus, it is possible to prevent thermal destruction even if the load remains short-circuited for a long time when the input voltage from the commercially distributed alternating-current power is high.

According to still another aspect of the present invention, a switching power supply apparatus has a serial circuit, including the primary coil of a transformer and a main switching device, connected between a positive and a negative power supply line connected to direct-current power produced from commercially distributed alternating-current power. The switching power supply apparatus outputs, via a positive and a negative output terminal, a direct-current voltage obtained by rectifying and smoothing with a rectifying/smoothing circuit a high-frequency voltage induced in the secondary coil of the transformer by the main switching device performing switching operation. Here, the switching power supply apparatus further includes: an output voltage detection circuit that detects the voltage between the positive and negative output terminals; a switching control circuit that controls the switching operation of the main switching device according to detection information from the output voltage detection circuit; a current detection circuit that is provided on the positive or negative output line and that short-circuits together both ends of the output voltage detection circuit when an overcurrent flows in the positive and negative output lines; a steady-state operation power supply circuit that feeds the switching control circuit with operating power produced by rectifying and smoothing a voltage that is induced in the auxiliary coil of the transformer substantially in proportion to the output voltage between the positive and negative output terminals during steady-state operation; and a constant current circuit that receives a current from the direct-current power or the commercially distributed alternating-current power at start up to feed the switching control circuit with a constant start-up current.

With this configuration, when the load connected between the positive and negative output terminals is, for example, short-circuited, the current detection circuit short-circuits together both ends of the output voltage detection circuit. Information on this short-circuiting is fed to the switching control circuit, and the switching control circuit stops operating. At start-up, a current from the direct-current power or the commercially distributed alternating-current power is fed, as a start-up current, through the constant current circuit to the switching control circuit.

Accordingly, even when the voltage of the commercially distributed alternating-current power becomes high, the switching control circuit is fed with a constant current from the constant current circuit. This permits the power consumed with the load short-circuited when the input voltage from the commercially distributed alternating-current power is high to be approximated to that consumed when the input voltage is low. Thus, it is possible to prevent thermal destruction even if the load remains short-circuited for a long time when the input voltage from the commercially distributed alternating-current power is high.

What is claimed is:

1. A switching power supply apparatus having a serial circuit, including a primary coil of a transformer and a main switching device, connected between a positive and a negative power supply line connected to direct-current power produced from commercially distributed alternating-current power, the switching power supply apparatus outputting a direct-current voltage obtained by rectifying and smoothing a high-frequency voltage induced in a secondary coil of the transformer by the main switching device performing switching operation, wherein the switching power supply apparatus further comprises:

a constant current circuit that feeds a constant current to a switching control circuit for controlling the main switching device, irrespective of a magnitude of an alternating-current voltage of the commercially distributed alternating-current power, even when the alternating-current voltage varies.

2. A switching power supply apparatus having a serial circuit, including a primary coil of a transformer and a main switching device, connected between a positive and a negative power supply line connected to direct-current power produced from commercially distributed alternating-current power, the switching power supply apparatus outputting, via a positive and a negative output terminal, a direct-current voltage obtained by rectifying and smoothing with a rectifying/smoothing circuit a high-frequency voltage induced in a secondary coil of the transformer by the main switching device performing switching operation, wherein the switching power supply apparatus further comprises:

an output voltage detection circuit that detects a voltage between the positive and negative output terminals;

a switching control circuit that controls switching operation of the main switching device according to detection information from the output voltage detection circuit;

a steady-state operation power supply circuit that feeds the switching control circuit with operating power produced by rectifying and smoothing a voltage that is induced in an auxiliary coil of the transformer substantially in proportion to an output voltage between the positive and negative output terminals during steady-state operation; and a constant current circuit that receives a current from the direct-current power or the commercially distributed alternating-current power at start up to feed the switching control circuit with a constant start-up current irrespective of a magnitude of an alternating-current voltage of the commercially distributed alternating-current power.

3. A switching power supply apparatus having a serial circuit, including a primary coil of a transformer and a main switching device, connected between a positive and a negative power supply line connected to direct-current power produced from commercially distributed alternating-current power, the switching power supply apparatus outputting, via a positive and a negative output terminal, a direct-current voltage obtained by rectifying and smoothing with a rectifying/smoothing circuit a high-frequency voltage induced in a secondary coil of the transformer by the main switching device performing switching operation, wherein the switching power supply apparatus further comprises:

an output voltage detection circuit that detects a voltage between the positive and negative output terminals;

a switching control circuit that controls switching operation of the main switching device according to detection information from the output voltage detection circuit;

a current detection circuit that is provided on the positive or negative output line and that short-circuits together both ends of the output voltage detection circuit when an overcurrent flows in the positive and negative output lines;

a steady-state operation power supply circuit that feeds the switching control circuit with operating power produced by rectifying and smoothing a voltage that is induced in an auxiliary coil of the transformer substantially in proportion to an output voltage between the positive and negative output terminals during steady-state operation; and a constant current circuit that receives a current from the direct-current power or the commercially distributed alternating-current power at start up to feed the switching control circuit with a constant start-up current irrespective of a magnitude of an alternating-current voltage of the commercially distributed alternating-current power.

4. The switching power supply apparatus as claimed in claim 2, wherein the detection information from the output voltage detection circuit is fed to the switching control circuit through a photodiode of a photocoupler which is connected in series with the output voltage detection circuit between the positive and negative output lines and through a phototransistor of the photocoupler which is connected to the switching control circuit.

5. The switching power supply apparatus as claimed in claim 2, wherein the constant current circuit includes a serial circuit that is composed of a resistor and a Zener diode and that is connected between the positive and negative power supply lines and a resistor that is connected to a node between the resistor and the Zener diode and through which the start-up current is fed to the switching control circuit.

6. The switching power supply apparatus as claimed in claim 2, wherein the constant current circuit includes a serial circuit, composed of a bias resistor of which one end is connected to the positive power supply line and a Zener diode, and a transistor of which a base is connected to a node between the bias resistor and the Zener diode, of which a collector is connected to the positive power supply line, and of which an emitter is connected through an emitter resistor to one end of the Zener diode, the start-up current being fed from the emitter of the transistor through the emitter resistor to the switching control circuit.

7. The switching power supply apparatus as claimed in claim 2, wherein the direct-current power is produced by subjecting the commercially distributed alternating-current power to full-wave rectification performed by a bridge rectifier circuit composed of bridge diodes, the start-up current being fed from one end of the commercially distributed alternating-current power through a serial circuit composed of the constant current circuit and a reverse current prevention diode to the switching control circuit.

8. The switching power supply apparatus as claimed in claim 2, wherein the direct-current power is produced by subjecting the commercially distributed alternating-current power to full-wave rectification performed by a bridge rectifier circuit composed of bridge diodes, the start-up current being fed from one end of the commercially distributed alternating-current power through a serial circuit composed of the constant current circuit and a reverse current prevention diode to the switching control circuit, the switching power supply apparatus further including an oscillation frequency varying circuit that detects a voltage at a node between the constant current circuit and the reverse current prevention diode and that, by using this voltage as a drive signal, varies an oscillation frequency of the switching control circuit.

9. The switching power supply apparatus as claimed in claim 2, wherein the direct-current power is produced by subjecting the commercially distributed alternating-current power to full-wave rectification performed by a bridge rectifier circuit composed of bridge diodes, the start-up current being fed from a node between a plurality of discharge resistors connected serially between both ends of the commercially distributed alternating-current power through a serial circuit composed of the constant current circuit and a reverse current prevention diode to the switching control circuit.

10. The switching power supply apparatus as claimed in claim 8, wherein the direct-current power is produced by subjecting the commercially distributed alternating-current power to full-wave rectification performed by a bridge rectifier circuit composed of bridge diodes, the constant current circuit includes a serial circuit, composed of a Zener diode and a plurality of resistors, connected between the negative power supply line and a node between a plurality of discharge resistors connected serially between both ends of the commercially distributed alternating-current power, a serial circuit composed of a resistor and a reverse current prevention diode is connected between the node between the resistors and the Zener diode and the operating power for the switching control circuit, and the oscillation frequency varying circuit varies the oscillation frequency of the switching control circuit by using as a drive signal a parabolic voltage produced by a capacitor connected between a node between the resistors and the negative power supply line.

11. The switching power supply apparatus as claimed in claim 2, wherein the detection information from the output voltage detection circuit is fed to the switching control circuit through a photodiode of a photocoupler which is connected in series with the output voltage detection circuit between the positive and negative output lines and through a phototransistor of the photocoupler which is connected to the switching control circuit, and the switching control circuit stops switching operation of the main switching device by detecting a decrease in a current through the phototransistor when a load is short-circuited.

12. The switching power supply apparatus as claimed in claim 3, wherein the detection information from the output voltage detection circuit is fed to the switching control circuit through a photodiode of a photocoupler which is connected in series with the output voltage detection circuit between the positive and negative output lines and through a phototransistor of the photocoupler which is connected to the switching control circuit.

13. The switching power supply apparatus as claimed in claim 3, wherein the constant current circuit includes a serial circuit that is composed of a resistor and a Zener diode and that is connected between the positive and negative power supply lines and a resistor that is connected to a node between the resistor and the Zener diode and through which the start-up current is fed to the switching control circuit.

14. The switching power supply apparatus as claimed in claim 3, wherein the constant current circuit includes a serial circuit, composed of a bias resistor of which one end is connected to the positive power supply line and a Zener diode, and a transistor of which a base is connected to a node between the bias resistor and the Zener diode, of which a collector is connected to the positive power supply line, and of which an emitter is connected through an emitter resistor to one end of the Zener diode, the start-up current being fed from the emitter of the transistor through the emitter resistor to the switching control circuit.

15. The switching power supply apparatus as claimed in claim 3, wherein the direct-current power is produced by subjecting the commercially distributed alternating-current power to full-wave rectification performed by a bridge rectifier circuit composed of bridge diodes, the start-up current being fed from one end of the commercially distributed alternating-current power through a serial circuit composed of the constant current circuit and a reverse current prevention diode to the switching control circuit.

16. The switching power supply apparatus as claimed in claim 3, wherein the direct-current power is produced by subjecting the commercially distributed alternating-current power to full-wave rectification performed by a bridge rectifier circuit composed of bridge diodes, the start-up current being fed from one end of the commercially distributed alternating-current power through a serial circuit composed of the constant current circuit and a reverse current prevention diode to the switching control circuit, the switching power supply apparatus further including an oscillation frequency varying circuit that detects a voltage at a node between the constant current circuit and the reverse current prevention diode and that, by using this voltage as a drive signal, varies an oscillation frequency of the switching control circuit.

17. The switching power supply apparatus as claimed in claim 3, wherein the direct-current power is produced by subjecting the commercially distributed alternating-current power to full-wave rectification performed by a bridge rectifier circuit composed of bridge diodes, the start-up current being fed from a node between a plurality of discharge resistors connected serially between both ends of the commercially distributed alternating-current power through a serial circuit composed of the constant current circuit and a reverse current prevention diode to the switching control circuit.

18. The switching power supply apparatus as claimed in claim 16, wherein the direct-current power is produced by subjecting the commercially distributed alternating-current power to full-wave rectification performed by a bridge rectifier circuit composed of bridge diodes, the constant current circuit includes a serial circuit, composed of a Zener diode and a plurality of resistors, connected between the negative power supply line and a node between a plurality of discharge resistors connected serially between both ends of the commercially distributed alternating-current power, a serial circuit composed of a resistor and a reverse current prevention diode is connected between the node between the resistors and the Zener diode and the operating power for the switching control circuit, and the oscillation frequency varying circuit varies the oscillation frequency of the switching control circuit by using as a drive signal a parabolic voltage produced by a capacitor connected between a node between the resistors and the negative power supply line.

* * * * *